United States Patent
Dey et al.

(10) Patent No.: US 12,417,514 B2
(45) Date of Patent: Sep. 16, 2025

(54) COMPRESSION OF IMAGES FOR GENERATING COMBINED IMAGES

(71) Applicant: QUALCOMM Incorporated, San Diego, CA (US)

(72) Inventors: Abhijeet Dey, Bengaluru (IN); Debarati Kundu, Bangalore (IN); Joby Abraham, Bangalore (IN); Animesh Behera, Bengaluru (IN); Nageswara Rao Vavintaparthi, Banglaore (IN); Venkatesh Hanamsagar, Bangalore (IN); Shridhar Prakash Patil, Chikkodi (IN); Yathati Sankeerth, Vizianagaram (IN)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/929,607

(22) Filed: Sep. 2, 2022

(65) Prior Publication Data

US 2024/0078635 A1    Mar. 7, 2024

(51) Int. Cl.
*A61K 35/12*    (2015.01)
*G06K 9/00*    (2022.01)
(Continued)

(52) U.S. Cl.
CPC ............... *G06T 5/50* (2013.01); *G06T 5/92* (2024.01); *G06T 9/00* (2013.01); *G06T 2207/10144* (2013.01); *G06T 2207/20221* (2013.01)

(58) Field of Classification Search
CPC . G06K 9/00; H04N 23/10; G06T 5/50; A61K 35/12
(Continued)

(56) References Cited

U.S. PATENT DOCUMENTS

| 10,368,053 B2 * | 7/2019 | Martinez Bauza .. H04N 13/207 |
| 2009/0103630 A1 | 4/2009 | Fuchikami et al. |

(Continued)

FOREIGN PATENT DOCUMENTS

| EP | 2801191 B1 | 11/2018 |
| WO | 2016171006 A1 | 10/2016 |

OTHER PUBLICATIONS

Ompressing and Companding High Dynamic Range Images with Subband Architectures Yuanzhen Li Lavanya Sharan Edward H. Adelson Dept. of Brain and Cognitive Sciences, and Computer Science and Articial Intelligence Lab (Year: 2005).*

(Continued)

*Primary Examiner* — Seyed H Azarian
(74) *Attorney, Agent, or Firm* — Polsinelli LLP

(57) ABSTRACT

Disclosed are systems, apparatuses, processes, and computer-readable media to capture images with subjects at different depths of fields. For instance, a method of processing image data includes obtaining a first image captured using an image sensor with a first exposure. The method may further include obtaining a second image captured using the image sensor with a second exposure. The method may include compressing the second image based on a comparison of the second image with the first image and storing the compressed second image in a memory. The method may further include obtaining the compressed second image from the memory and decompressing the compressed second image based on a difference between the compressed second image and the first image. The method may further include generating a combined image at least in part by combining the first image and the second image.

29 Claims, 18 Drawing Sheets

(51) Int. Cl.
   *G06T 5/50*     (2006.01)
   *G06T 5/92*     (2024.01)
   *G06T 9/00*     (2006.01)
(58) Field of Classification Search
   USPC ....... 382/100, 103, 106–107, 123, 162, 172,
                382/173, 181, 189, 199, 219, 224, 232,
                382/244, 254, 274, 276, 284–291, 305,
                       382/312; 348/E13.001, 51
   See application file for complete search history.

(56)            References Cited

U.S. PATENT DOCUMENTS

| | | | |
|---|---|---|---|
| 2010/0183071 | A1 | 7/2010 | Segall et al. |
| 2012/0050474 | A1* | 3/2012 | Segall .................. G06T 5/50 |
| | | | 348/E13.001 |
| 2018/0082408 | A1* | 3/2018 | Dewhurst ............ H04N 23/741 |
| 2019/0073956 | A1* | 3/2019 | Huang ................ G09G 3/3677 |
| 2020/0267339 | A1 | 8/2020 | Douady-Pleven et al. |
| 2020/0358944 | A1 | 11/2020 | Douady et al. |
| 2022/0284554 | A1* | 9/2022 | Guerin .................. H04N 23/10 |
| 2023/0115821 | A1* | 4/2023 | Jannard .................. G06T 5/70 |
| | | | 382/274 |

OTHER PUBLICATIONS

International Search Report and Written Opinion—PCT/US2023/070381 —ISA/EPO—Oct. 5, 2023.

* cited by examiner

COMPRESSION OF IMAGES FOR GENERATING COMBINED IMAGES

FIELD

The present application is generally related to processing image data. For example, systems and techniques described herein relate to compressing images to reduce bandwidth and power required for synthesizing a combined image (e.g., an HDR image) from a plurality of images.

BACKGROUND

A camera is a device that receives light and captures image frames, such as still images or video frames, using an image sensor. Cameras may include processors, such as image signal processors (ISPs), that can receive one or more image frames and process the one or more image frames. For example, a raw image frame captured by a camera sensor can be processed by an ISP to generate a final image. Cameras can be configured with a variety of image capture and image processing settings to alter the appearance of an image. Some camera settings are determined and applied before or during the capture of the photograph, such as ISO, exposure time, aperture size, f/stop, shutter speed, focus, and gain. Other camera settings can configure the post-processing of a photograph, such as alterations to contrast, brightness, saturation, sharpness, levels, curves, or colors.

Cameras can be configured with a variety of image capture and image processing settings. The application of different settings can result in frames or images with different appearances. Some camera settings are determined and applied before or during the capture of the photograph, such as ISO, exposure time (also referred to as exposure duration), aperture size, f/stop, shutter speed, focus, and gain. Other camera settings can configure the post-processing of a photograph, such as alterations to contrast, brightness, saturation, sharpness, levels, curves, or colors.

SUMMARY

In some examples, systems and techniques are described for compressing images to create a high dynamic range (HDR) image. The systems and techniques can reduce the bandwidth and power required for synthesizing an HDR image from a plurality of images that are captured in sequence.

According to at least one example, a method is provided for generating one or more images. The method includes: obtaining a first image captured using an image sensor, the first image being associated with a first exposure; obtaining a second image captured using the image sensor, the second image being associated with a second exposure; compressing the second image based on a comparison of the second image with the first image; storing the compressed second image in a memory; obtaining the compressed second image from the memory; decompressing the compressed second image based on a difference between the compressed second image and the first image; and generating a combined image at least in part by combining the first image and the second image.

In another example, an apparatus for generating one or more images is provided that includes at least one memory and at least one processor coupled to the at least one memory. The at least one processor is configured to: obtain a first image captured using an image sensor, the first image being associated with a first exposure; obtain a second image captured using the image sensor, the second image being associated with a second exposure; compress the second image based on a comparison of the second image with the first image; store the compressed second image in a memory; obtain the compressed second image from the memory; decompress the compressed second image based on a difference between the compressed second image and the first image; and generate a combined image at least in part by combining the first image and the second image.

In another example, a non-transitory computer-readable medium is provided that has stored thereon instructions that, when executed by one or more processors, cause the one or more processors to: obtain a first image captured using an image sensor, the first image being associated with a first exposure; obtain a second image captured using the image sensor, the second image being associated with a second exposure; compress the second image based on a comparison of the second image with the first image; store the compressed second image in a memory; obtain the compressed second image from the memory; decompress the compressed second image based on a difference between the compressed second image and the first image; and generate a combined image at least in part by combining the first image and the second image.

In another example, an apparatus for generating one or more images is provided. The apparatus includes: means for obtaining a first image captured using an image sensor, the first image being associated with a first exposure; means for obtaining a second image captured using the image sensor, the second image being associated with a second exposure; means for compressing the second image based on a comparison of the second image with the first image; means for storing the compressed second image in a memory; means for obtaining the compressed second image from the memory; means for decompressing the compressed second image based on a difference between the compressed second image and the first image; and means for generating a combined image at least in part by combining the first image and the second image.

According to at least one other example, a method is provided for processing one or more images. The method includes: reading a first image from a pixel array of an image sensor; reading a second image from the pixel array; compressing the second image based on the first image; and sending the first image and the compressed second image to an image sensor processor (ISP).

In another example, an apparatus for processing one or more images is provided that includes at least one memory and at least one processor coupled to the at least one memory. The at least one processor is configured to: read a first image from a pixel array of an image sensor; read a second image from the pixel array; compress the second image based on the first image; and send the first image and the compressed second image to an image sensor processor (ISP).

In another example, a non-transitory computer-readable medium is provided that has stored thereon instructions that, when executed by one or more processors, cause the one or more processors to: read a first image from a pixel array of an image sensor; read a second image from the pixel array; compress the second image based on the first image; and send the first image and the compressed second image to an image sensor processor (ISP).

In another example, an apparatus for processing one or more images is provided. The apparatus includes: means for reading a first image from a pixel array of an image sensor; means for reading a second image from the pixel array;

means for compressing the second image based on the first image; and means for sending the first image and the compressed second image to an image sensor processor (ISP).

In some aspects, one or more of the apparatuses described herein is, is part of, and/or includes a wearable device, an extended reality (XR) device (e.g., a virtual reality (VR) device, an augmented reality (AR) device, or a mixed reality (MR) device), a head-mounted device (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1A:
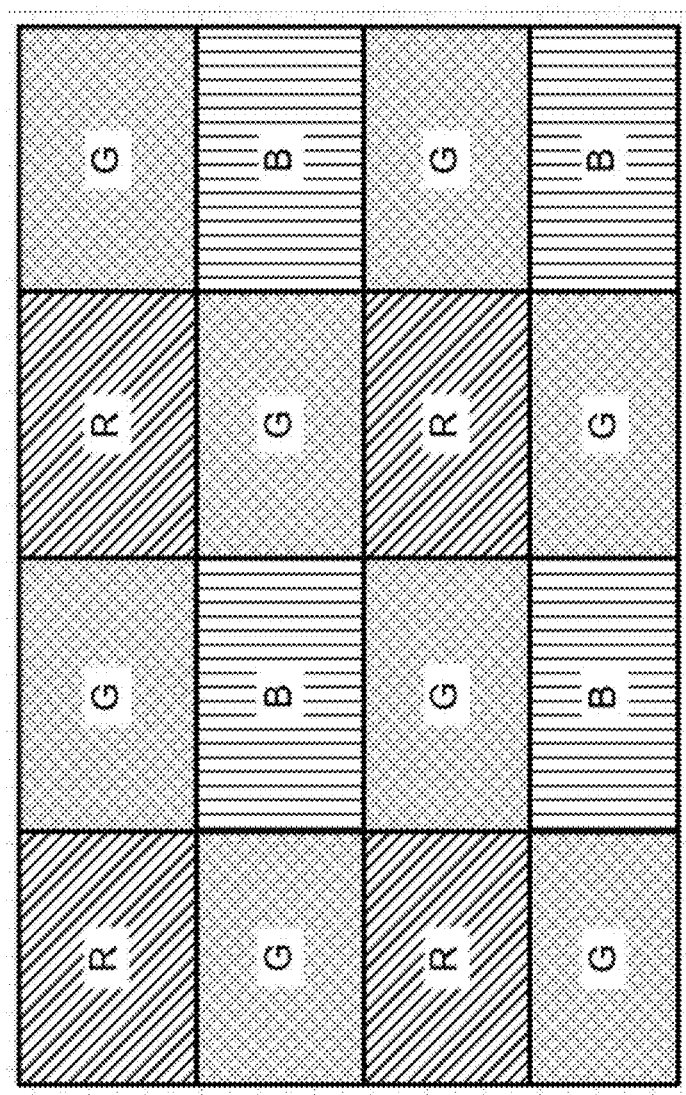
FIG. 1A, FIG. 1B, and FIG. 1C are diagrams illustrating example configurations for an image sensor of an image capture device, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The ensuing description provides example aspects only, and is not intended to limit the scope, applicability, or configuration of the disclosure. Rather, the ensuing description of the exemplary aspects will provide those skilled in the art with an enabling description for implementing an aspect of the disclosure. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during the capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor (ISP)) for processing the one or more image frames captured by the image sensor.

A dynamic range of a digital imaging device, such as a digital camera, is the ratio between the largest amount of light that the device can capture without light saturation and the lowest amount of light the device can accurately measure and distinguish from intrinsic image noise (electrical noise, thermal noise, etc.). Traditionally, digital cameras are able to capture only a small portion of the natural illumination range of a real-world scene. For example, the dynamic range of a scene may be, 100,000:1, while the dynamic range of the image sensor of a digital camera may be, 100:1. When the dynamic range of the scene exceeds the dynamic range of the sensor, details in the regions of highest light levels and/or lowest light levels are lost.

An imaging device can generate a high dynamic range (HDR) image by merging multiple images that are captured with different exposure settings. For instance, an imaging device can generate an HDR image by merging a short-exposure image captured with a short-exposure time, a medium-exposure image captured with a medium exposure time that is longer than the short-exposure time, and a long-exposure image captured with a long exposure time that is longer than the medium exposure time. Because short-exposure images are generally dark, they generally preserve the most detail in the highlights (bright areas) of a photographed scene. Medium-exposure images and the long-exposure images are generally brighter than short-exposure images, and may be overexposed (e.g., too bright to make out details) in the highlight portions (bright areas) of the scene. Because long-exposure images generally include bright portions, they may preserve detail in the shadows (dark areas) of a photographed scene. Medium-exposure images and the short-exposure images are generally darker than long-exposure images, and may be underexposed (e.g., too dark to make out details in) in the shadow portions (dark areas) of the scene, making their depictions of the shadows too dark to observe details. To generate an HDR image, the imaging device may, for example, use portions of the short-exposure image to depict highlights (bright areas) of the photographed scene, use portions of the long-exposure image depicting shadows (dark areas) of the scene, and use portions of the medium-exposure image depicting other areas (other than highlights and shadows) of a scene.

Imaging devices are increasing in resolution and framerate to increase visual fidelity, which increases the bandwidth and power requirements of image capturing systems. For example, ultrahigh definition (FHD) video (e.g., with a resolution of 3840×2160 at 30 frames per second (FPS)) requires capturing and transmitting at least 60 images from an image sensor to an image signal processor (ISP) device that processes and outputs images for recording or display. Adding additional exposure images, such as a medium exposure to increase image quality, can exceed bandwidth capacity between the image sensor and the image processing circuitry. Increasing the framerate may also exceed the bandwidth capacity of the bus. In addition, the processing required to output, transmit, and store the images in memory consumes a significant amount of power and can exceed power consumption limitations. For instance, one example chipset can support 8K video (e.g., with a resolution of 7680×4320) at 30 FPS with standard HDR (8K30-SHDR) and consumes 3.2 watts of power. However, such an example chipset is thermally limited to 3.1 watts of power. Device manufacturers may be unable to support these features because of the combination of power consumption and bandwidth limitations, while display manufacturers can support images with higher framerates and/or higher resolution.

In some aspects, systems, apparatuses, processes (also referred to as methods), and computer-readable media (collectively referred to herein as "systems and techniques") are described for compressing one or more images, such as during a process of generating a combined image (e.g., during an HDR process, such as an HDR synthesis process, to generate an HDR image). For instance, an imaging system can compress a target image based on at least one reference image. In some examples, the reference image may be a long-exposure image and the target image be a short-exposure image (which has a shorter or smaller exposure than the long-exposure image). The short-exposure image may be captured during capture of the long-exposure image. In other examples, the reference image may be the short-exposure image and the target image be the long-exposure image. In some aspects, the systems and techniques can perform a lossless compression by determining a pixel difference between pixels of the reference image and the target image. In one illustrative example, the short-exposure image is normalized with respect to the long-exposure image, and a difference in each pixel is determined by subtracting the respective value of each normalized pixel. Compression efficiencies can be achieved if the pixel values between the reference image and the target image are similar. For instance, if a normalized value of the respective pixels differ by a particular value (e.g., a value of 32), the pixel difference can be encoded in fewer bits.

In some aspects of the disclosure, the systems and techniques may compress one or more images in an image sensor. The systems and techniques may send or transmit the compressed image to an ISP. In one illustrative aspect, the image sensor can read out a reference image from the sensor array and use the reference image to compress a subsequent image based on normalized difference between the reference image and the subsequent image. Compressing the subsequent image in the ISP and transmitting the compressed image reduces the amount of bandwidth and power consumption.

Additional details and aspects of the present disclosure are described in more detail below with respect to the figures.

Image sensors include one or more arrays of photodiodes or other photosensitive elements. Each photodiode measures an amount of light that eventually corresponds to a particular pixel in the image produced by the image sensor. In some cases, different photodiodes may be covered by different color filters of a color filter array and may thus measure light matching the color of the color filter covering the photodiode.

Figure 1B:
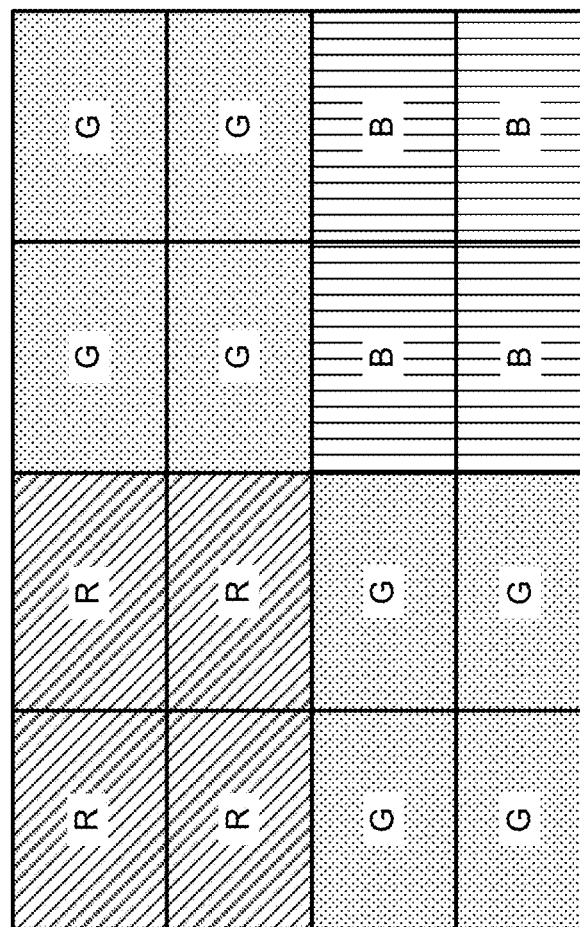

Various color filter arrays can be used, including a Bayer color filter array, a quad color filter array (also referred to as a quad Bayer filter or QCFA), and/or other color filter array. An example of a Bayer color filter array 100 is shown in FIG. 1A. As shown, the Bayer color filter array 100 includes a repeating pattern of red color filters, blue color filters, and green color filters. As shown in FIG. 1B, a QCFA 110 includes a 2×2 (or "quad") pattern of color filters, including a 2×2 pattern of red (R) color filters, a pair of 2×2 patterns of green (G) color filters, and a 2×2 pattern of blue (B) color filters. The pattern of the QCFA 110 shown in FIG. 1B is repeated for the entire array of photodiodes of a given image sensor. Using either QCFA 110 or the Bayer color filter array 100, each pixel of an image is generated based on red light data from at least one photodiode covered in a red color filter of the color filter array, blue light data from at least one photodiode covered in a blue color filter of the color filter array, and green light data from at least one photodiode covered in a green color filter of the color filter array. Other types of color filter arrays may use yellow, magenta, and/or cyan (also referred to as "emerald") color filters instead of or in addition to red, blue, and/or green color filters. The different photodiodes throughout the pixel array can have different spectral sensitivity curves, therefore responding to different wavelengths of light. Monochrome image sensors may also lack color filters and therefore lack color depth.

In some cases, subgroups of multiple adjacent photodiodes (e.g., 2×2 patches of photodiodes when QCFA 110 shown in FIG. 1B is used) can measure the same color of light for approximately the same region of a scene. For example, when photodiodes included in each of the subgroups of photodiodes are in close physical proximity, the light incident on each photodiode of a subgroup can originate from approximately the same location in a scene (e.g., a portion of a leaf on a tree, a small section of sky, etc.).

In some examples, a brightness range of light from a scene may significantly exceed the brightness levels that the image sensor can capture. For example, a digital single-lens reflex (DSLR) camera may be able to capture a 1:30,000 contrast ratio of light from a scene while the brightness levels of an HDR scene can exceed a 1:1,000,000 contrast ratio.

In some cases, HDR sensors may be utilized to enhance the contrast ratio of an image captured by an image capture device. In some examples, HDR sensors may be used to obtain multiple exposures within one image or frame, where such multiple exposures can include short (e.g., 5 ms) and long (e.g., 15 or more ms) exposure times. As used herein, a long-exposure time generally refers to any exposure time that longer than a short-exposure time.

Figure 1C:
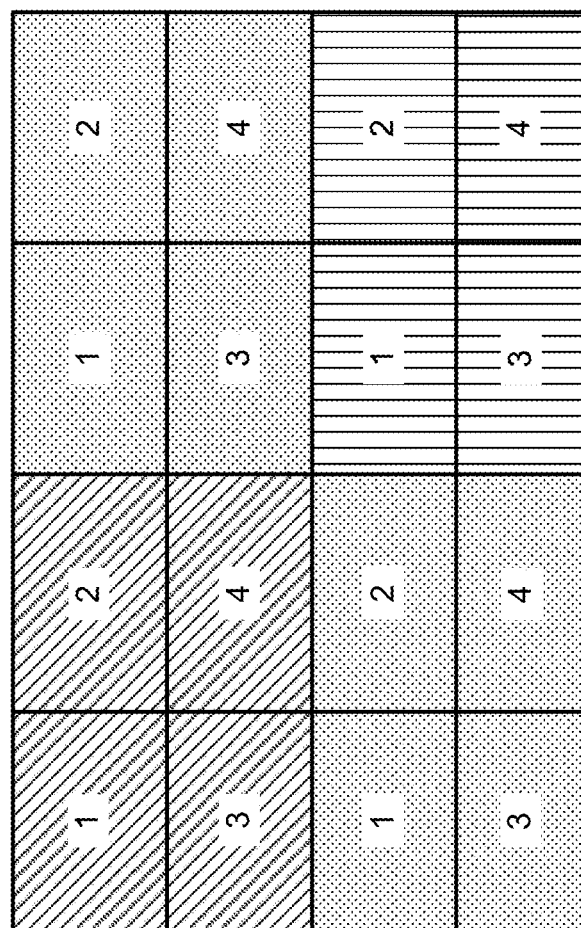

In some implementations, HDR sensors may be able to configure individual photodiodes within subgroups of photodiodes (e.g., the four individual R photodiodes, the four individual B photodiodes, and the four individual G photodiodes from each of the two 2×2 G patches in the QCFA 110 shown in FIG. 1B) to have different exposure settings. A collection of photodiodes with matching exposure settings is also referred to as photodiode exposure group herein. FIG. 1C illustrates a portion of an image sensor array with a QCFA filter that is configured with four different photodiode exposure groups 1 through 4. As shown in the example photodiode exposure group array 120 in FIG. 1C, each 2×2 patch can include a photodiode from each of the different photodiode exposure groups for a particular image sensor.

Although four groupings are shown in a specific grouping in FIG. 1C, a person of ordinary skill will recognize that different numbers of photodiode exposure groups, different arrangements of photodiode exposure groups within subgroups, and any combination thereof can be used without departing from the scope of the present disclosure.

As noted with respect to FIG. 1C, in some HDR image sensor implementations, exposure settings corresponding to different photodiode exposure groups can include different exposure times (also referred to as exposure lengths), such as short exposure, medium exposure, and long exposure. In some cases, different images of a scene associated with different exposure settings can be formed from the light captured by the photodiodes of each photodiode exposure group. For example, a first image can be formed from the light captured by photodiodes of photodiode exposure group 1, a second image can be formed from the photodiodes of photodiode exposure group 2, a third image can be formed from the light captured by photodiodes of photodiode exposure group 3, and a fourth image can be formed from the light captured by photodiodes of photodiode exposure group 4. Based on the differences in the exposure settings corresponding to each group, the brightness of objects in the scene captured by the image sensor can differ in each image. For example, well-illuminated objects captured by a photodiode with a long-exposure setting may appear saturated (e.g., completely white). In some cases, an image processor can select between pixels of the images corresponding to different exposure settings to form a combined image.

In one illustrative example, the first image corresponds to a short-exposure time (also referred to as a short-exposure image), the second image corresponds to a medium exposure time (also referred to as a medium exposure image), and the third and fourth images correspond to a long-exposure time (also referred to as long-exposure images). In such an example, pixels of the combined image corresponding to portions of a scene that have low illumination (e.g., portions of a scene that are in a shadow) can be selected from a long-exposure image (e.g., the third image or the fourth image). Similarly, pixels of the combined image corresponding to portions of a scene that have high illumination (e.g., portions of a scene that are in direct sunlight) can be selected from a short-exposure image (e.g., the first image.

In some cases, an image sensor can also utilize photodiode exposure groups to capture objects in motion without blur. The length of the exposure time of a photodiode group can correspond to the distance that an object in a scene moves during the exposure time. If light from an object in motion is captured by photodiodes corresponding to multiple image pixels during the exposure time, the object in motion can appear to blur across the multiple image pixels (also referred to as motion blur). In some implementations, motion blur can be reduced by configuring one or more photodiode groups with short-exposure times. In some implementations, an image capture device (e.g., a camera) can determine local amounts of motion (e.g., motion gradients) within a scene by comparing the locations of objects between two consecutively captured images. For example, motion can be detected in preview images captured by the image capture device to provide a preview function to a user on a display. In some cases, a machine learning model can be trained to detect localized motion between consecutive images.

Figure 2:
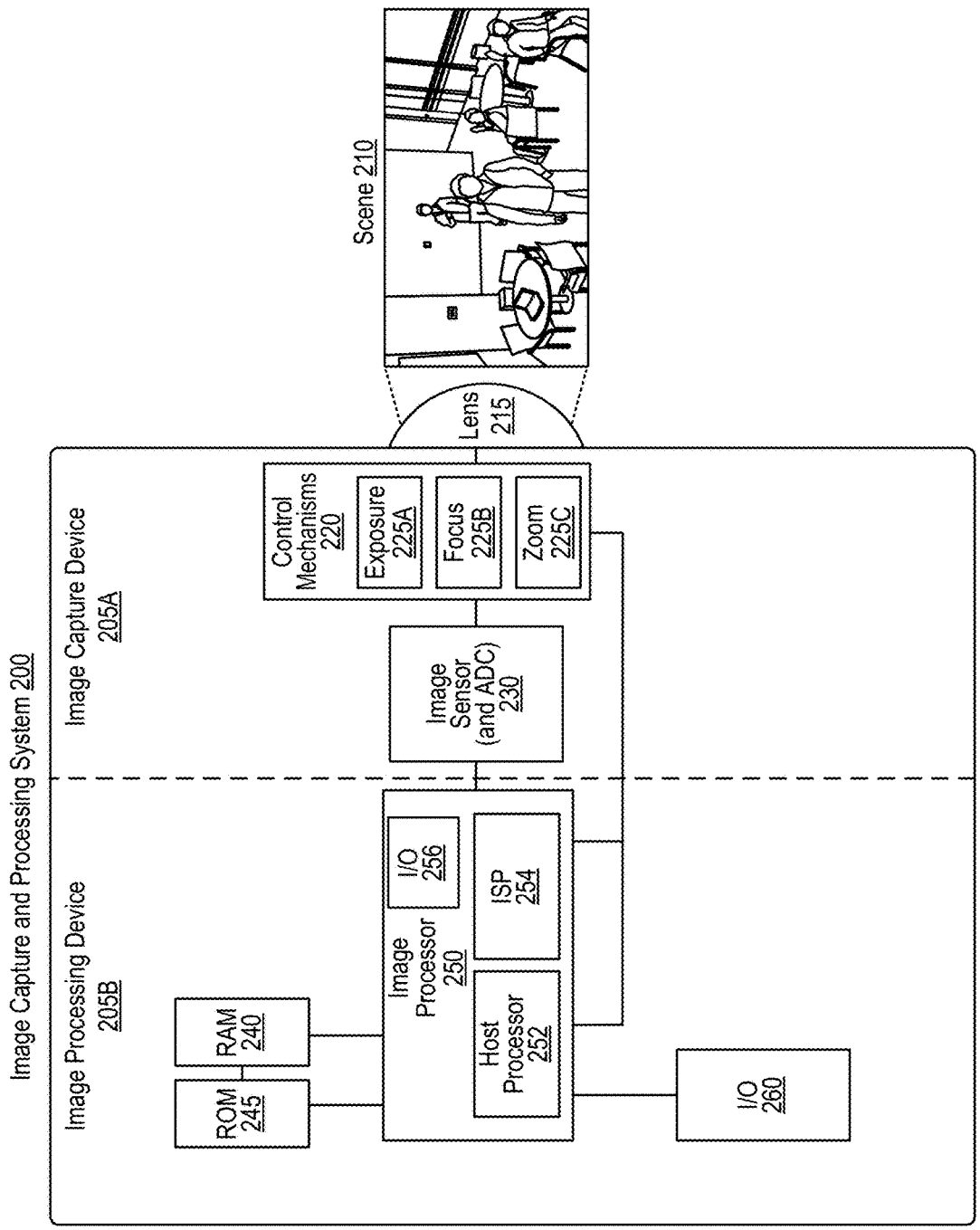
FIG. 2 is a block diagram illustrating an architecture of an image capture and processing device, in accordance with aspects of the present disclosure.

Various aspects of the techniques described herein will be discussed below with respect to the figures. FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. In some cases, the lens 215 and image sensor 230 can be associated with an optical axis. In one illustrative example, the photosensitive area of the image sensor 230 (e.g., the photodiodes) and the lens 215 can both be centered on the optical axis. A lens 215 of the image capture and processing system 200 faces a scene 210 and receives light from the scene 210. The lens 215 bends incoming light from the scene toward the image sensor 230. The light received by the lens 215 passes through an aperture. In some cases, the aperture (e.g., the aperture size) is controlled by one or more control mechanisms 220 and is received by an image sensor 230. In some cases, the aperture can have a fixed size.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo (or other lens mechanism), thereby adjusting focus. In some cases, additional lenses may be included in the image capture and processing system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 220, the image sensor 230, and/or the image processor 250. The focus setting may be referred to as an image capture setting and/or an image processing setting. In some cases, the lens 215 can be fixed relative to the image sensor and focus control mechanism 225B can be omitted without departing from the scope of the present disclosure.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 225C moves one or more of the lenses in the afocal zoom system, such as the negative lens and one or both of the positive lenses. In some cases, zoom control mechanism 225C can control the zoom by capturing an image from an image sensor of a plurality of image sensors (e.g., including image sensor 230) with a zoom corresponding to the zoom setting. For example, image processing system 200 can include a wide angle image sensor with a relatively low zoom and a telephoto image sensor with a greater zoom. In some cases, based on the selected zoom setting, the zoom control mechanism 225C can capture images from a corresponding sensor.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different filters. In some cases, different photodiodes can be covered in color filters, and may thus measure light matching the color of the filter covering the photodiode. Various color filter arrays can be used, including a Bayer color filter array (as shown in FIG. 1A), a QCFA (see FIG. 1B), and/or any other color filter array.

Returning to FIG. 1A and FIG. 1B, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 230) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 230 may alternately or additionally include opaque and/or reflective masks that block light from reaching certain photodiodes, or portions of certain photodiodes, at certain times and/or from certain angles. In some cases, opaque and/or reflective masks may be used for PDAF. In some cases, the opaque and/or reflective masks may be used to block portions of the electromagnetic spectrum from reaching the photodiodes of the image sensor (e.g., an IR cut filter, an ultraviolet (UV) cut filter, a band-pass filter, low-pass filter, high-pass filter, or the like). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 15:
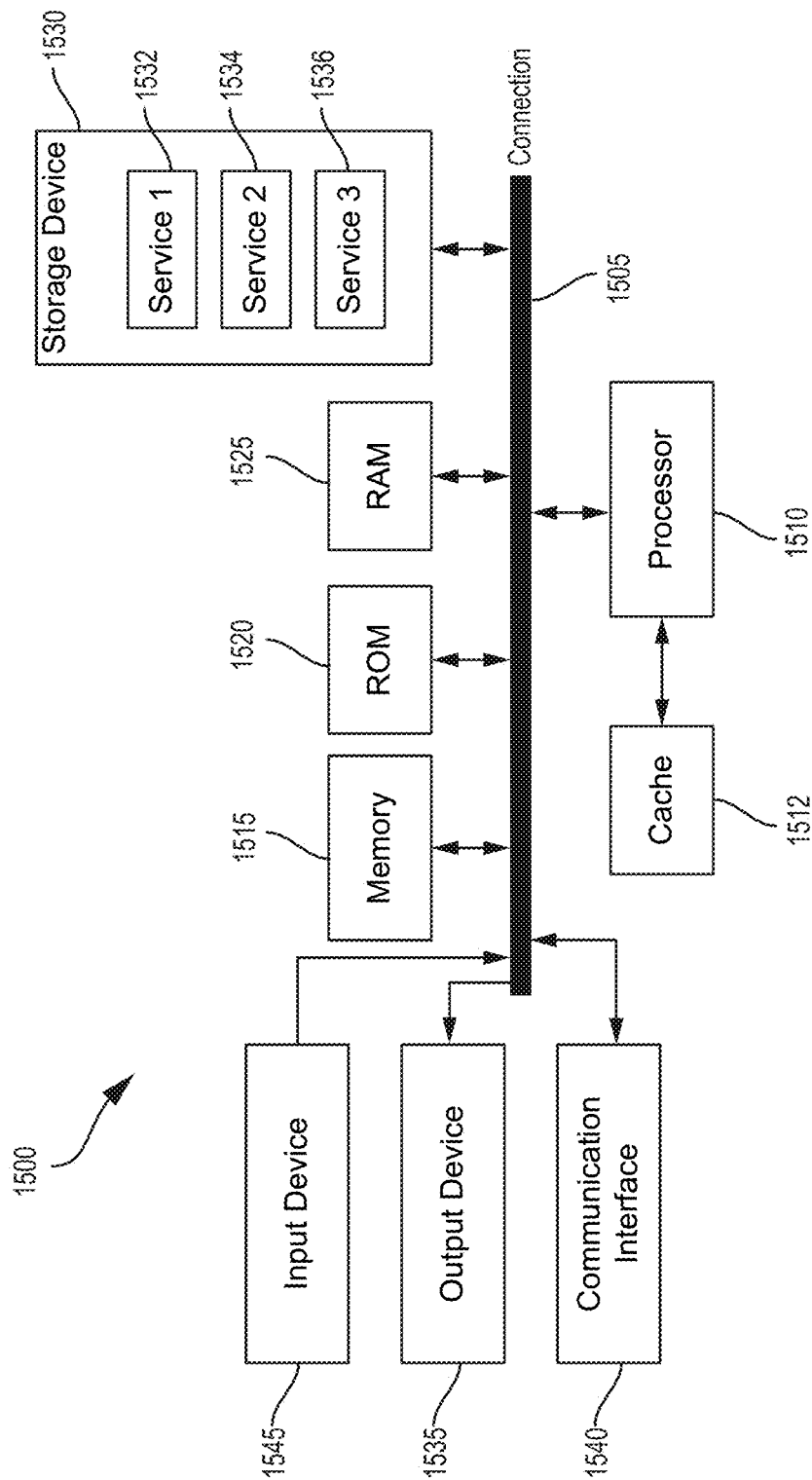
FIG. 15 is a diagram illustrating an example of a system for implementing certain aspects described herein.

The image processor 250 may include one or more processors, such as one or more ISPs (e.g., ISP 254), one or more host processors (e.g., host processor 252), and/or one or more of any other type of processor 1610 discussed with respect to the computing system 1600 of FIG. 15. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using a MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 250 may store image frames and/or processed images in random access memory (RAM) 240, read-only memory (ROM) 245, a cache, a memory unit, another storage device, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 1635, any other input devices 1645, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the image capture and processing system 200 and one or more peripheral devices, over which the image capture and processing system 200 may receive data from the one or more peripheral device and/or transmit data to the one or more peripheral devices. The I/O 260 may include one or more wireless transceivers that enable a wireless connection between the image capture and processing system 200 and one or more peripheral devices, over which the image capture and processing system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

Figure 3:
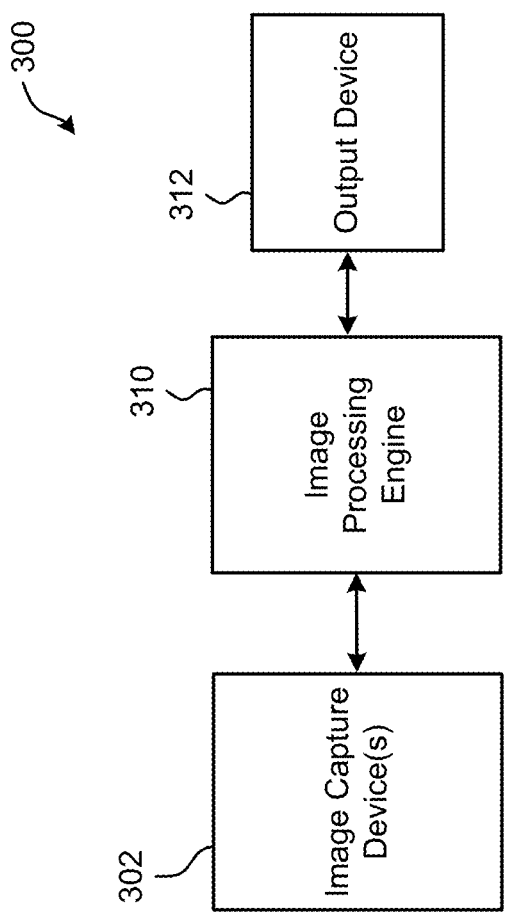
FIG. 3 is a block diagram illustrating an example of an image capture system, in accordance with aspects of the present disclosure.

FIG. 3 is a block diagram illustrating an example of an image capture system 300. The image capture system 300 includes various components that are used to process input images or frames to produce an output image or frame. As shown, the components of the image capture system 300 include one or more image capture devices 302, an image processing engine 310, and an output device 312. The image processing engine 310 can produce high dynamic range depictions of a scene, as described in more detail herein.

The image capture system 300 can include or be part of an electronic device or system. For example, the image capture system 300 can include or be part of an electronic device or system, such as a mobile or stationary telephone handset (e.g., smartphone, cellular telephone, or the like), an extended reality (XR) device (e.g., a virtual reality (VR) device, an augmented reality (AR) device, or a mixed reality (MR) device), a vehicle or computing device/system of a vehicle, a server computer (e.g., in communication with another device or system, such as a mobile device, an XR system/device, a vehicle computing system/device, etc.), a desktop computer, a laptop or notebook computer, a tablet computer, a set-top box, a television, a camera device, a display device, a digital media player, a video streaming device, or any other suitable electronic device. In some examples, the image capture system 300 can include one or more wireless transceivers (or separate wireless receivers and transmitters) for wireless communications, such as cellular network communications, 802.11 Wi-Fi communications, WLAN communications, Bluetooth or other short-range communications, any combination thereof, and/or other communications. In some implementations, the components of the image capture system 300 can be part of the same computing device. In some implementations, the components of the image capture system 300 can be part of two or more separate computing devices.

While the image capture system 300 is shown to include certain components, one of ordinary skill will appreciate that image capture system 300 can include more components or fewer components than those shown in FIG. 3. In some cases, additional components of the image capture system 300 can include software, hardware, or one or more combinations of software and hardware. For example, in some cases, the image capture system 300 can include one or more other sensors (e.g., one or more inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 3. In some implementations, additional components of the image capture system 300 can include and/or can be implemented using electronic circuits or other electronic hardware, which can include one or more programmable electronic circuits (e.g., DSPs, microprocessors, microcontrollers, GPUs, CPUs, any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture system 300.

The one or more image capture devices 302 can capture image data and generate images (or frames) based on the image data and/or can provide the image data to the image processing engine 310 for further processing. The one or more image capture devices 302 can also provide the image data to the output device 312 for output (e.g., on a display). In some cases, the output device 312 can also include storage. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image. In addition to image data, the image capture devices can also generate supplemental information such as the amount of time between successively captured images, timestamps of image capture, or the like.

Figure 4:
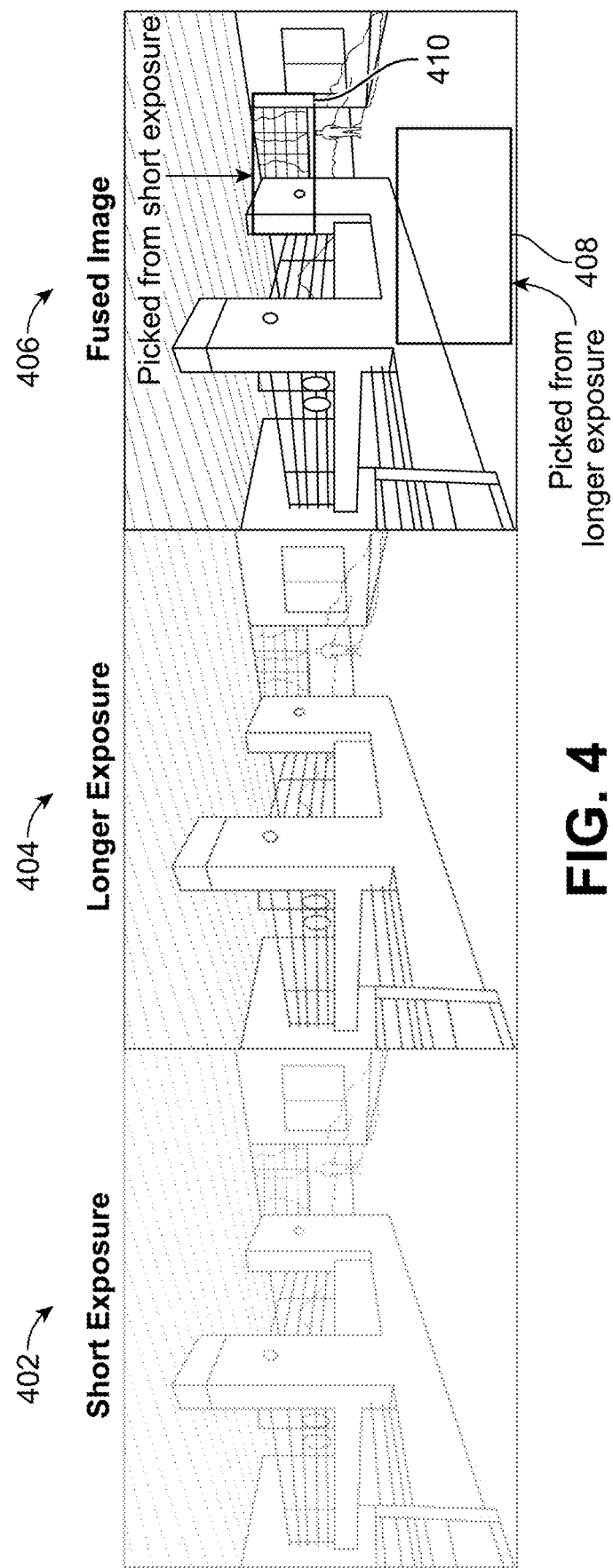
FIG. 4 is a diagram illustrating generation of a fused frame from short and long-exposure frames, in accordance with aspects of the present disclosure.

FIG. 4 illustrates techniques for generating a fused frame (also referred to as a combined frame or combined image) from short and long-exposure frames. As shown, a short-exposure frame 402 and a long-exposure frame 404 may be taken, which may be fused to provide a fused frame output 406 (e.g., an HDR frame output). Due to a bit depth of an image capture sensor, some pixels of a capture frame may be oversaturated, resulting in the image not showing some textures of a scene as shown in the short-exposure frame 402. Thus, to generate an HDR frame, both short and long-exposure frames may be captured, which may be fused (e.g., combined) to generate an HDR output frame. A fusion of short and long-exposure frames may be performed to generate a fused output frame that includes parts of the short-exposure frame and parts of the long-exposure frame. For example, region 408 of the fused frame output 406 may be from the long-exposure frame 404, while region 410 of the fused frame output 406 may be from the short-exposure frame 402. However, fusing short and long-exposure frames may result in irregularities due to global motion (e.g., motion of the image capture device). For example, from the time when the long-exposure frame is captured to the time when the short-exposure frame is captured, the image capture device or objects in a scene may have moved, causing irregularities if steps are not taken to align the short and long-exposure frames prior to fusing the frames together. This global motion issue may also arise due to a rolling shutter, as described in more detail herein.

Figure 5:
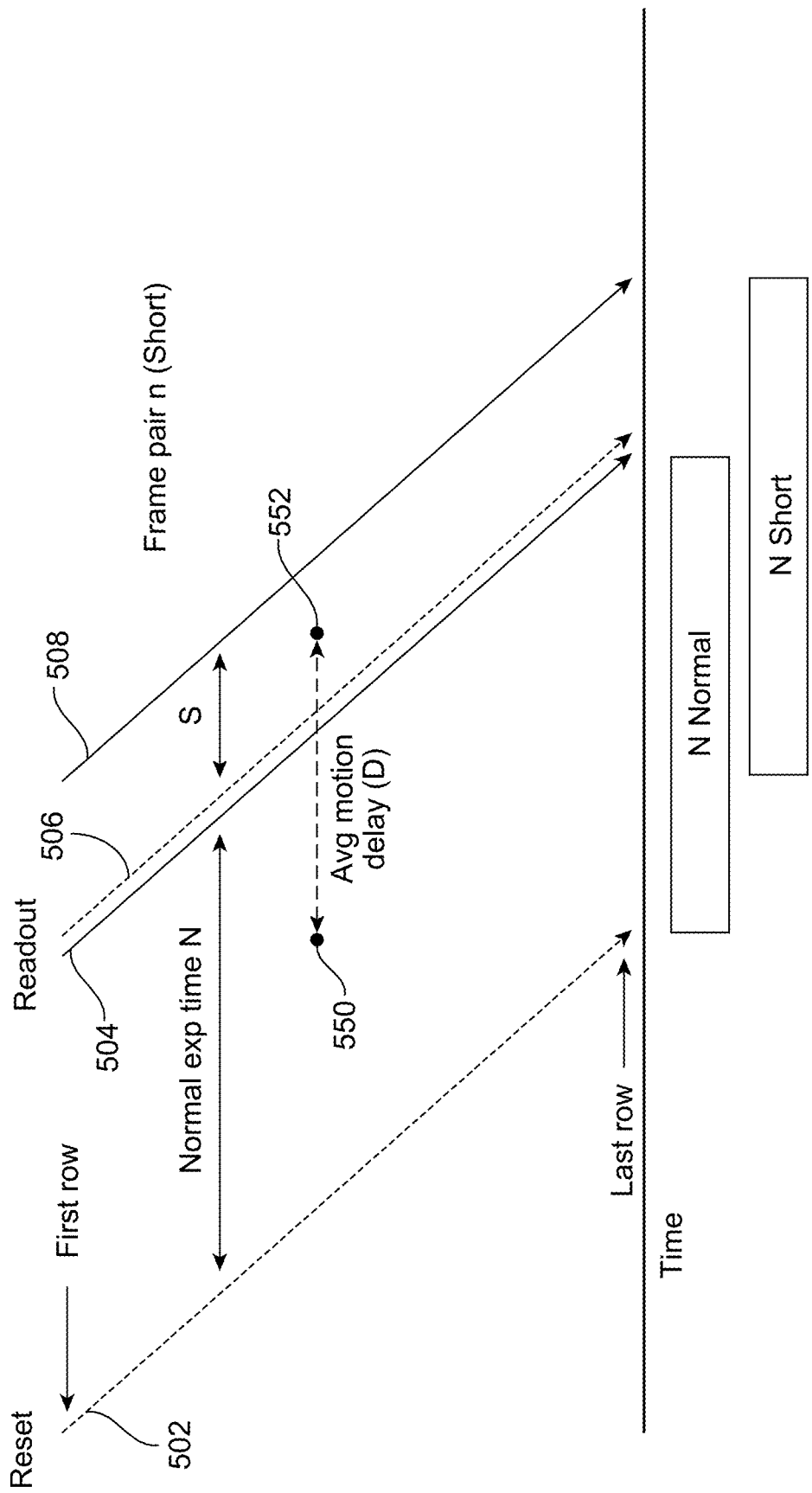
FIG. 5 is a diagram illustrating long-exposure and short-exposure streams from an image sensor, in accordance with certain of the present disclosure.

FIG. 5 is a diagram illustrating long-exposure and short-exposure streams (e.g., MIPI stream) from an image sensor (e.g., image sensor 230) to an imaging front end for processing. Line 502 represents the start of long-exposure sensing (also referred to herein as normal exposure sensing), and line 504 represents the end of the long-exposure sensing. The long-exposure sensing starts from the first row of a sensor (e.g., image sensor 230 of FIG. 2) to the last row of the sensor, as shown. For each row (e.g., row of photodiodes), once the long-exposure sensing has completed, short-exposure sensing begins while the long-exposure sensing continues to the next row. For example, line 506 represents the beginning of the short-exposure sensing, and line 508 represents the end of the short-exposure sensing, starting from the first row to the last row of the image sensor. The long-exposure sensing (e.g., having a duration labeled "N Normal" in FIG. 5) may begin prior to the short-exposure sensing (e.g., having a duration labeled "N short" in FIG. 5).

Once the long-exposure sensing for a particular row is completed, a short delay (e.g., associated with the gap between lines 504, 506) occurs before the short-exposure sensing begins. Once the short-exposure sensing has finished for a particular row, the information for the row is read out from the image sensor for processing. Due to the gap from the long-exposure sensing to the short-exposure sensing (e.g., shown as an average motion delay (D) in FIG. 5), an opportunity exists for a user who is holding the camera to move and/or for objects in a scene being captured to move, resulting in a misalignment of features in the short and long-exposure frames (e.g., features that are common or the same in the short and long-exposure frames). For example, a motion delay (D) may exist from time 550 (e.g., time when half of the long-exposure data is captured) and time 552 (e.g., the time when half of the short-exposure data is captured). The motion delay (D) may be estimated as being the average motion delay associated with different long and short frame capture events (e.g., different HDR frame captures).

Because the sensing occurs one row at a time (e.g., starting from the first row to the last row), a rolling shutter global motion also occurs. The camera or objects in scene may move from when the data for a first row of sensors are captured to when the data for a last row of sensors are captured.

Figure 6:
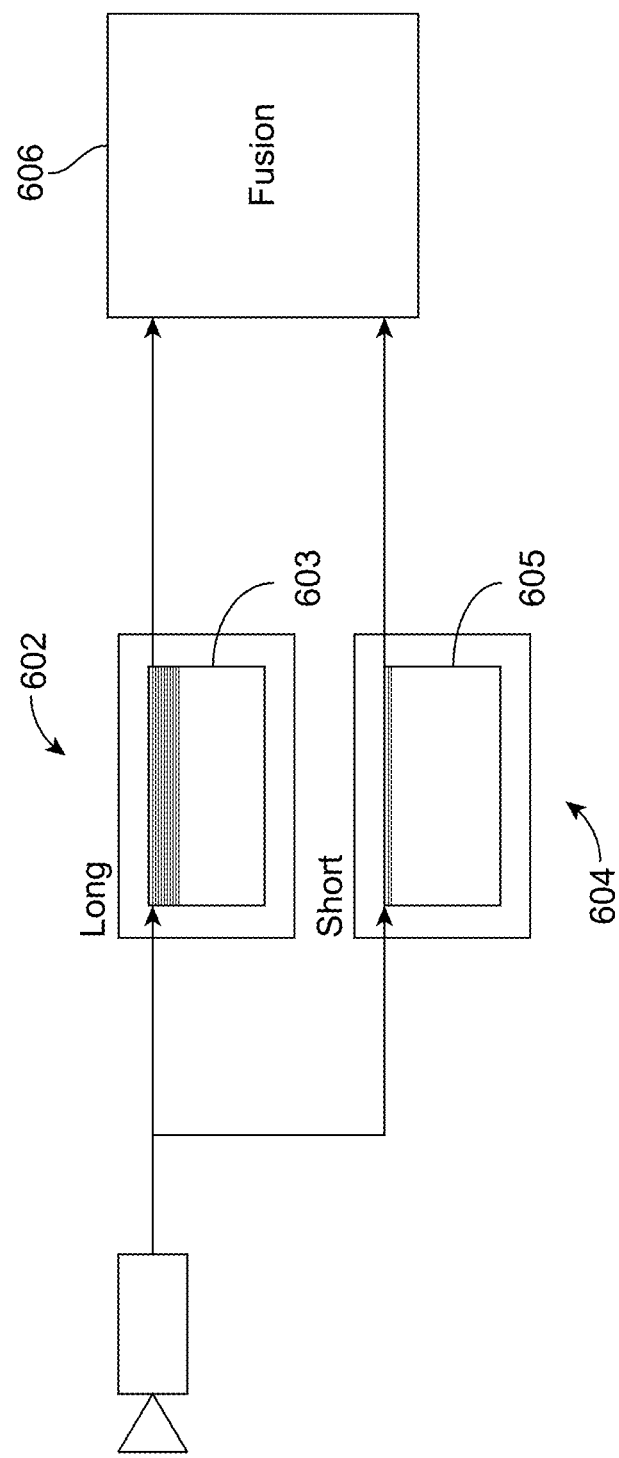
FIG. 6 is a diagram illustrating an example of in-line fusion of one or more short-exposure frames and one or more long-exposure frames, in accordance with aspects of the present disclosure.

FIG. 6 is a diagram illustrating techniques for an in-line fusion of one or more short-exposure frames 604 and one or more long-exposure frames 602. A fusion engine 606 can fuse the one or more short-exposure frames 604 and the one or more long-exposure frames 602 to generate an HDR frame or image. As described with respect to FIG. 5, long-exposure data corresponding to the one or more long-exposure frames 602 may be captured for each row prior to the short-exposure data corresponding to the one or more short-exposure frames 604. Therefore, the data from each row for the one or more long-exposure frames 602 may be received and stored in a buffer 603 prior to the data for each row for the one or more short-exposure frames 604 being stored in a buffer 605. As shown, the accumulation of data for the one or more long-exposure frames 602 may be ahead of the accumulation of data for the one or more short-exposure frames 604 (e.g., since the long-exposure capture occurs prior to the short-exposure capture as shown in FIG. 5).

In some cases, fusion by the fusion engine 606 may begin once a particular number of sensor rows or lines (e.g., the first 3 rows/lines, the first 4 rows/lines, the first 8 rows/lines, or other number of rows/lines) of the short frame data corresponding to the one or more short-exposure frames 604 are accumulated. For example, upon receiving the short frame data for the particular number of sensor rows, operation for frame alignment may begin (e.g., instead of waiting for the entire frame to be received). However, various constraints may exist when performing frame alignment. For example, it may not be possible to fully warp a long-exposure frame (from one or more long-exposure frames 602) to align with a short-exposure frame (from the one or more short-exposure frames 604). Moreover, due to hardware timing constraints, the programming of alignment may have to be performed two or three frames in advance. In some aspects, a large buffer may be established for capturing frame data. Image data from the image sensor may be written at the center part of the image buffer, enabling the application of shifts in x and y dimensions to the data stored in the buffer for alignment. Moreover, certain aspects of the present disclosure provide techniques for alignment prediction to allow for the programming of alignment operations in advance.

Figure 7:
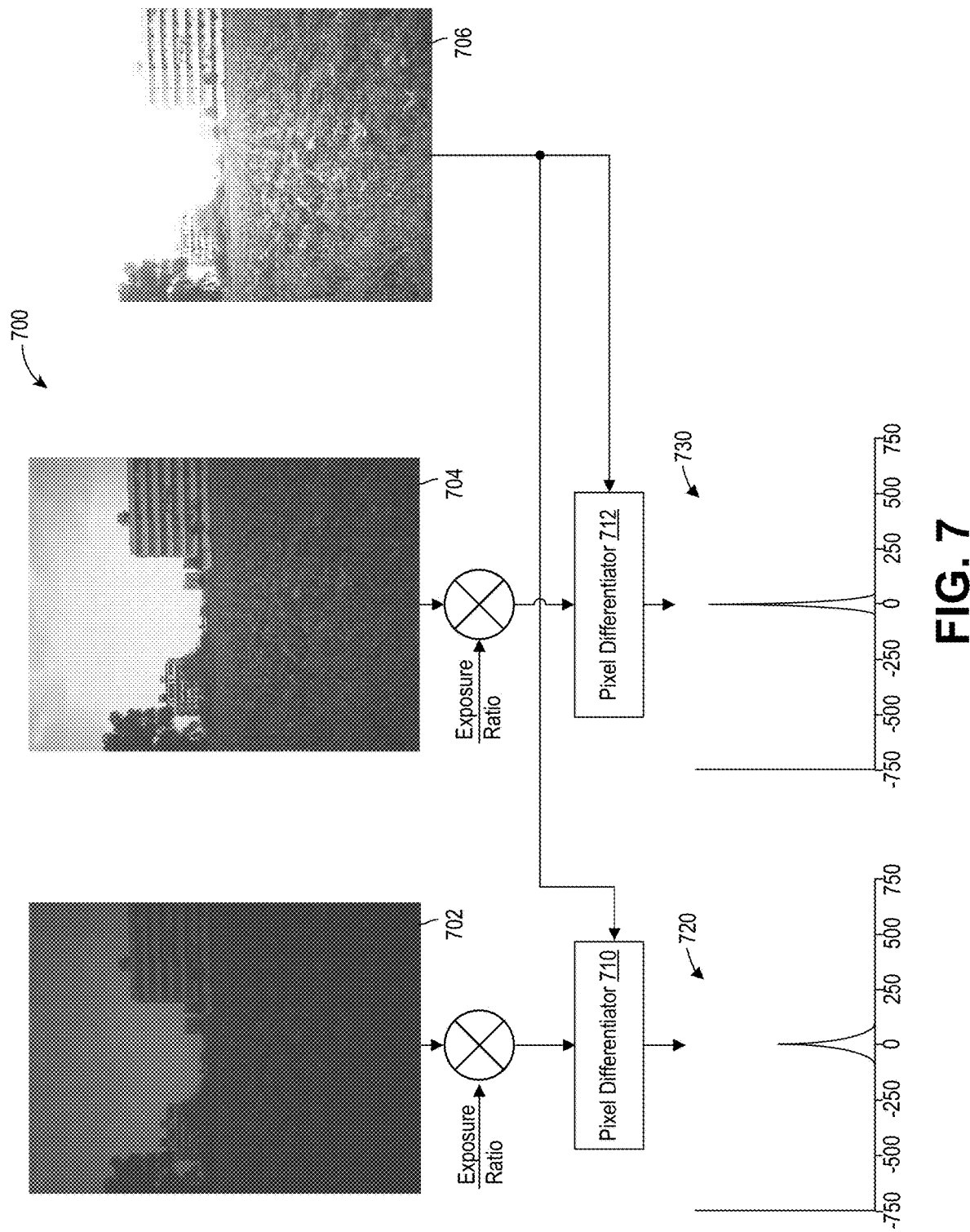
FIG. 7 is a conceptual diagram that illustrates differences between images that are captured by an image capturing system with different exposure times in accordance with some aspects of the disclosure.

FIG. 7 is a conceptual diagram 700 that illustrates differences between images that are captured by an image capturing system with different exposure times in accordance with some aspects of the disclosure. In particular, diagram 700 illustrates a short-exposure image 702, a medium exposure image 704, and a long-exposure image 706 that are captured by an image processing system. In conventional HDR image synthesis processes, the short-exposure image 702, the medium exposure image 704, and the long-exposure image 706 are provided from an image sensor to an ISP (e.g., ISP 254) for processing. The ISP may store the short-exposure image 702, the medium exposure image 704, and the long-exposure image 706 in a memory and then process the short-exposure image 702, the medium exposure image 704, and the long-exposure image 706 into a single HDR image.

As described above, each of the short-exposure image 702, the medium exposure image 704, and the long-exposure image 706 are read out from the sensor array by the image sensor and have different exposure times but capture the same content. Diagram 700 illustrates that the short-exposure image 702 is multiplied by the short-to-long-exposure ratio to normalize the short-exposure image 702 in intensity with respect to the long-exposure image 706. For example, if the short-exposure time is 10 milliseconds (ms) and the long-exposure time is 40 ms, the brightness of the pixels in the short-exposure image 702 is multiplied by an exposure ratio of 4.0. The normalized short-exposure image 702 and the long-exposure image 706 are then compared in a pixel differentiator 710. In one illustrative example, the pixel differentiator 710 calculates a difference between each pixel to produce a differential pixel bitmap, and graph 720 illustrates a difference in pixel values between the normalized short-exposure image 702 and the long-exposure image 706.

Graph 720 illustrates a difference in all pixel values between the short-exposure image 702 and the long-exposure image 706, with the center point 0 indicating that the pixel values are identical, and an absolute value of the difference corresponding to how different pixels are between the short-exposure image 702 and the long-exposure image 706. In this illustrative example, 95.1% of all pixel values are within a value of 64.

Diagram 700 illustrates that the medium exposure image 704 is multiplied by the medium-to-long-exposure ratio to normalize the luminance (e.g., lux) of pixels in the short-exposure image 702 with respect to the long-exposure image 706. For example, if the medium exposure time is 20 milliseconds (ms) and the long-exposure time is 40 ms, the luminance of the pixels in the medium exposure image 704 is multiplied by an exposure ratio of 2.0. The normalized medium exposure image 704 and the long-exposure image 706 are then compared in a pixel differentiator 711. In one illustrative example, the pixel differentiator 712 calculates a difference between each pixel to produce a differential pixel bitmap, and graph 730 illustrates a difference in pixel values between the normalized medium exposure image 704 and the long-exposure image 706. For the normalized short-exposure image 702, 99.3% of all pixels are within a value of 32.

According to some aspects of the disclosure, a reference image (e.g., the long-exposure image) can be used to compress the pixels of an image based on the pixel difference. By compressing the images based on the reference image, the compressed image can be stored in memory with a reduced size, which reduces the number of bits that need to be written into a memory device and conserves power. In addition, reducing the size of the image written into memory also enables device manufacturers to support higher framerates and higher resolutions.

In one illustrative aspect, a reference image is selected to be compared to the other images and serves as a basis for the compression described below. FIG. 7 describes that the long-exposure image is the reference image and provides the best compression. Alternatively, other exposure images (e.g., the short-exposure image, and the medium exposure image) can be used as reference images. For example, a short-exposure image may be used as a reference image because it is read out first from an image sensor.

Figure 8A:
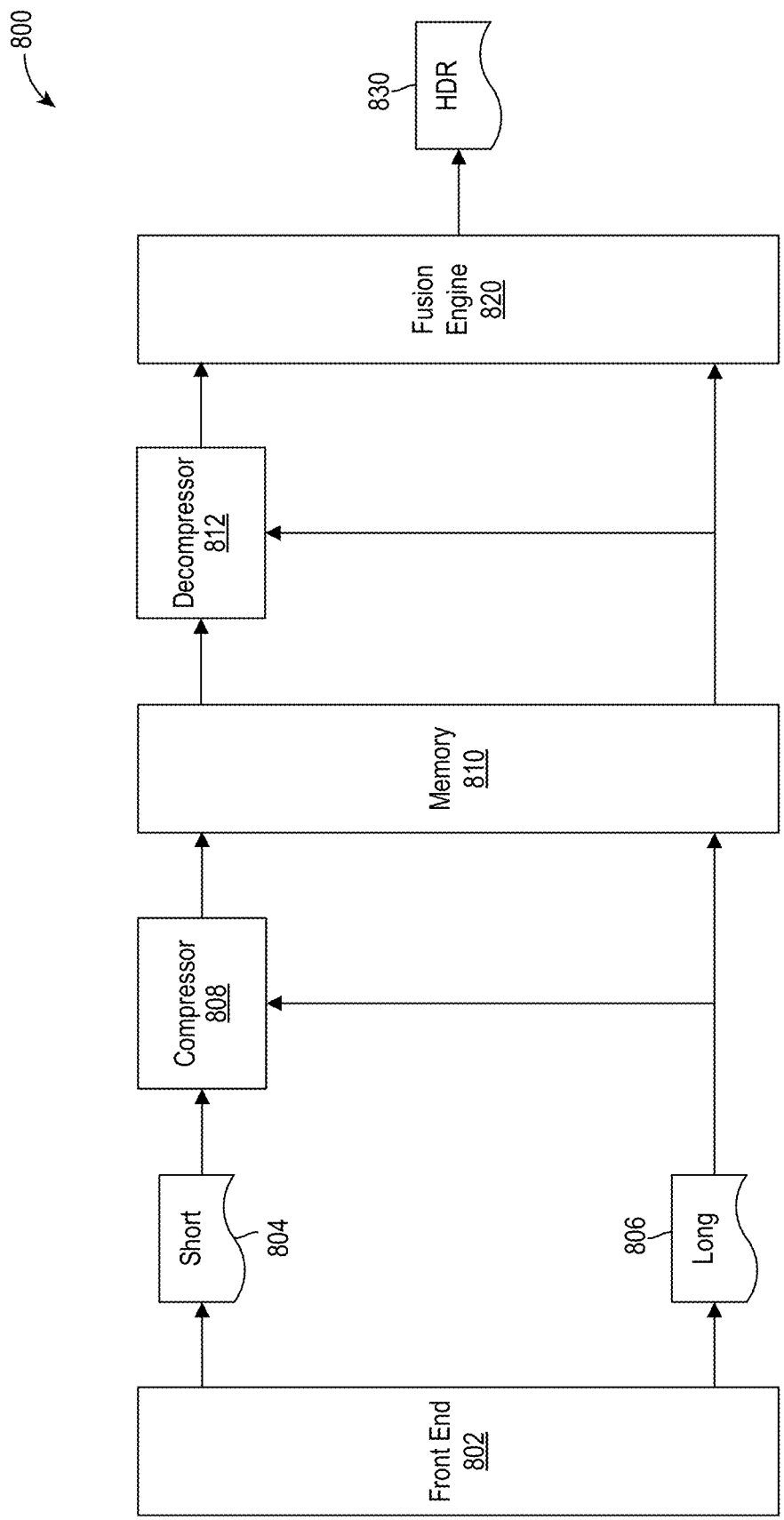
FIG. 8A is a diagram that illustrates an image capturing system that compresses at least one image during high dynamic range (HDR) image synthesis to reduce bandwidth and power in accordance with some aspects of the disclosure.

FIG. 8A is a diagram that illustrates an image capturing system 800 that compresses at least one image during HDR image synthesis to reduce bandwidth and power in accordance with some aspects of the disclosure. The image capturing system 800 includes a front end 802 of an ISP that receives at least a short-exposure image 804 and a long-exposure image 806 from an image sensor (not shown), and a fusion engine 820 that synthesizes the short-exposure image 804 and the long-exposure image 806 into an HDR image 830. In some aspects, the ISP is connected to a memory device 810 for storing and retrieval of images receives by the front end 802 for processing. For example, the memory device can be a double data rate (DDR) memory.

In some aspects, the image capturing system 800 includes compressor 808 that receives the short-exposure image 804 and the long-exposure image 806 and compresses the short-exposure image 804 based on the pixel differences between the short-exposure image 804 and the long-exposure image 806. A detailed block diagram of a compressor 808 is described herein with reference to FIG. 9. The compressor 808 stores the compressed images in a memory device 810 (e.g., DDR memory), and the front end 802 may also store the long-exposure image 806 in a memory device 810.

In some cases, the image capturing system 800 may be processing other content and temporarily stores the compressed short-exposure image 804 and the long-exposure image 806 until previous images are processed. The fusion engine 820 may request the short-exposure image 804 and the long-exposure image 806, which causes the memory device 810 to read the compressed short-exposure image 804 and the long-exposure image 806. A decompressor 812 receives both the compressed short-exposure image 804 and the long-exposure image 806 and decompresses the short-exposure image 804 based on pixel differences encoded into the short-exposure image 804 with respect to the pixels in the long-exposure image 806 and provides the decompressed short-exposure image 804 to the fusion engine 820. The fusion engine also receives the long-exposure image 806 and fuses the short-exposure image 804 and the long-exposure image 806 into an HDR image 830.

In some aspects, the compressor 808 can be lossless and based on a pixel difference of each pixel within the reference image, or the long-exposure image 806 in this illustrative example. For example, because the decompressor 812 uses the encoded pixel differences in the compressed short-exposure image 804 and combines the pixel difference with the pixels in the long-exposure image 806, the original value of the long-exposure image 806 can be restored. In some other aspects, the compressor 808 can also use a lossy compression based on an average of pixels in the reference image. As will be described below with reference to FIG. 11, a cache may not have sufficient size and a downsampled reference image may be used to support lossy compression.

Figure 8B:
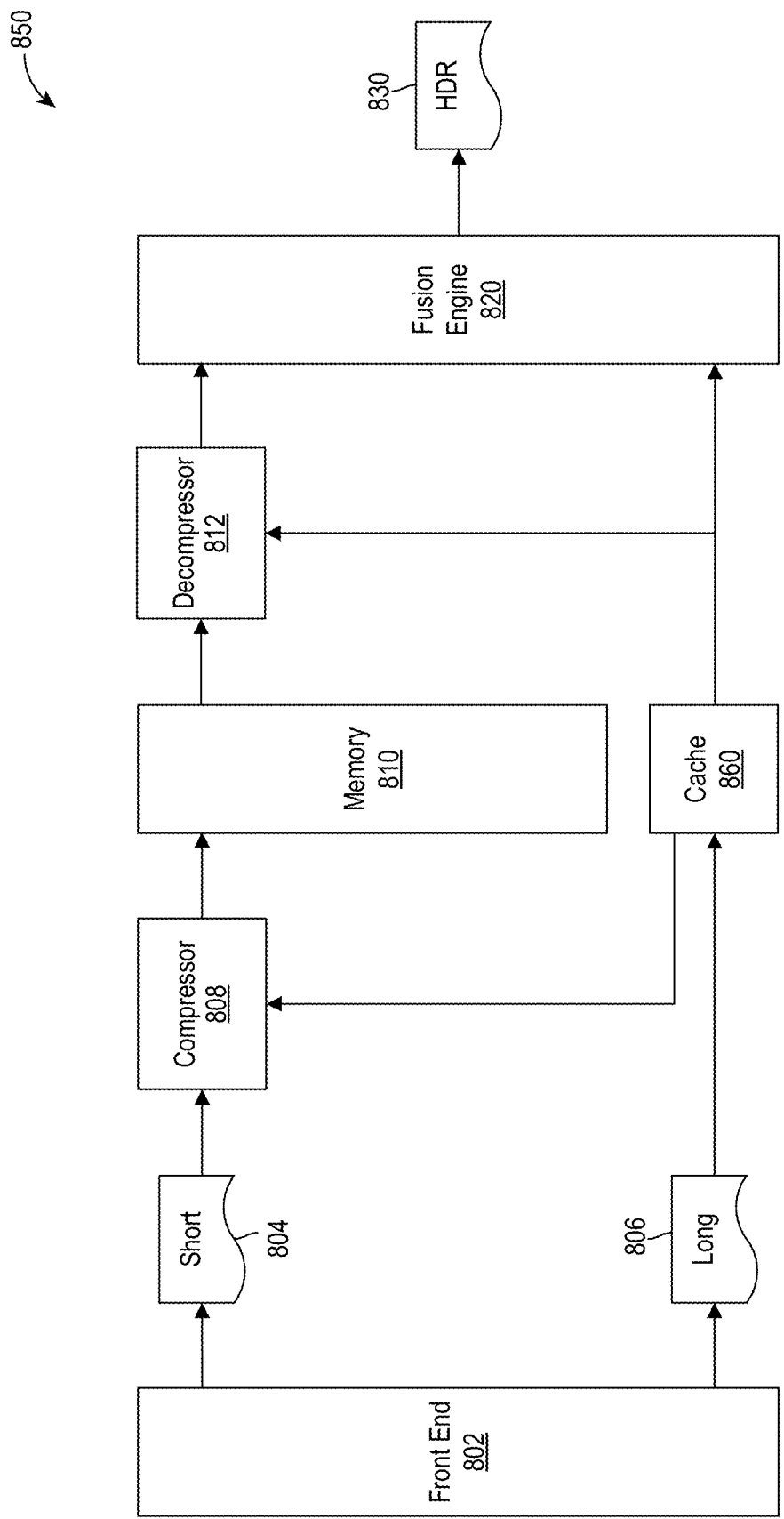
FIG. 8B is a diagram that illustrates another image capturing system that compresses at least one image during HDR image synthesis to reduce bandwidth and power in accordance with some aspects of the disclosure.

FIG. 8B is a diagram that illustrates another image capturing system 850 that compresses at least one image during HDR image synthesis to reduce bandwidth and power in accordance with some aspects of the disclosure. The image capturing system 850 comprises a cache 860 for storing the reference image (e.g., the long-exposure image 806). For example, the cache 860 may be integral to a hardware processor integrated into the ISP and can store the reference image due to the faster read-out performance of the cache 860 as compared to the memory device 810.

Figure 9:
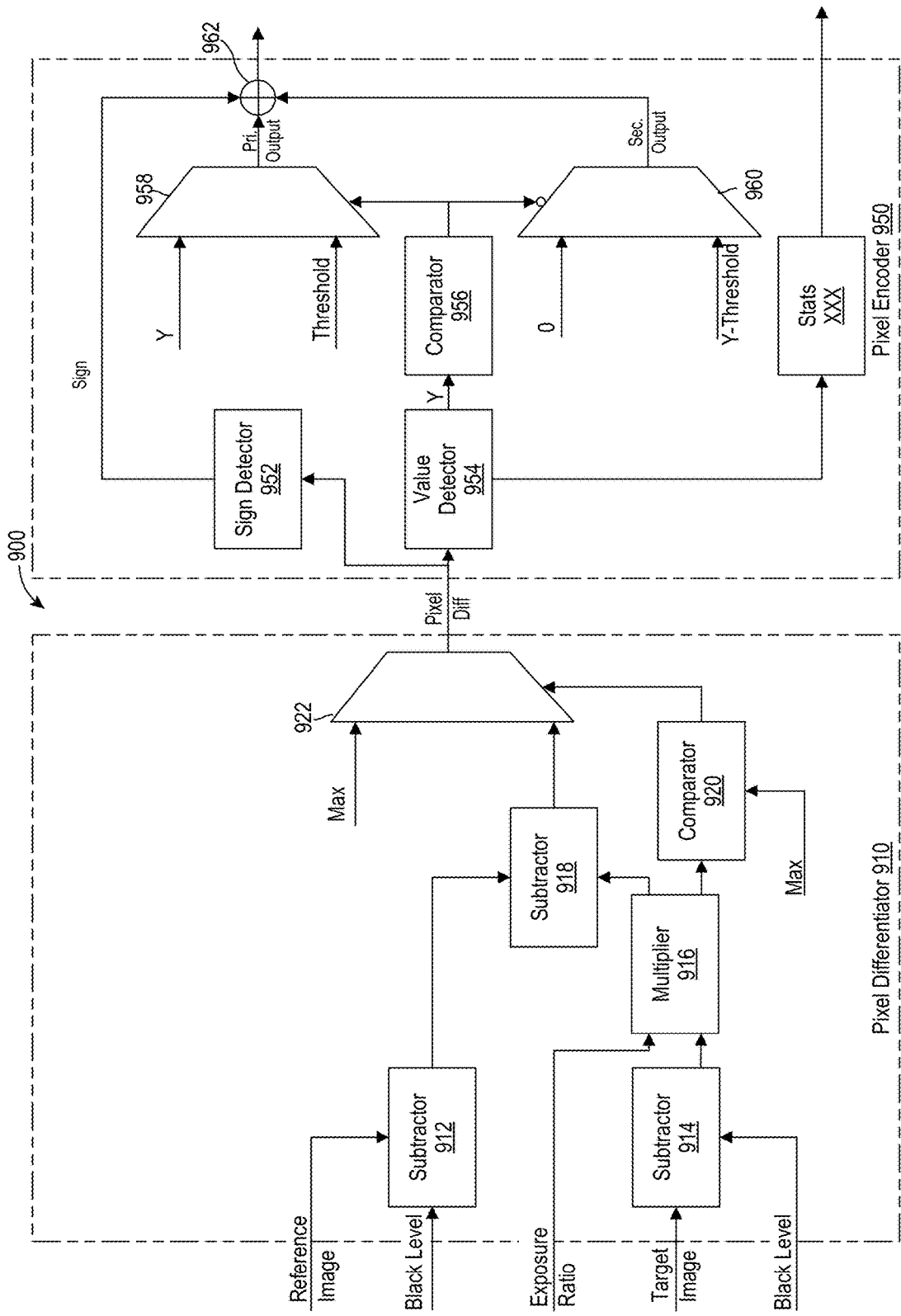
FIG. 9 is a block diagram of a compression engine that is configured to losslessly compress at least one image during HDR image synthesis in accordance with some aspects of the disclosure.

FIG. 9 is a block diagram of a compressor 900 that is configured to losslessly compress at least one image during HDR image synthesis in accordance with some aspects of the disclosure. The compressor 900 includes a pixel differentiator 910 configured to identify pixel differences as described above and a pixel encoder 950 that encodes the pixel differences into a format that reduces the size of images.

In one illustrative example, the pixel differentiator 910 includes a subtractor 912 that receives the reference image and a black level (BL). The black level is the lowest value that an image sensor can read out and is an inherent property associated with the image sensor (e.g., a Bayer filter). For example, presuming that the black level is an 8-bit value, an example black level can be 60 and is the minimum value that the image sensor will read out for a single pixel. The subtractor 912 subtracts the black level from pixels to produce a normalized reference image that minimizes any variations.

The pixel differentiator 910 also includes a subtractor 914 that receives a target image that will be compressed (e.g., a short-exposure image, a medium exposure image, etc.) and subtracts the black level as part of the normalization process to minimize any variations in the various images. In one illustrative example, the target image is a short-exposure image. After subtracting the black level, the BL-corrected target image is provided to a multiplier 916 that also receives an exposure ratio. The multiplier 916 is configured to multiply the BL-corrected target image by the exposure ratio to increase the luminance of the image to correspond to the reference image. The multiplier 916 produces a normalized target image, and both the normalized target image and the normalized reference image are provided to a subtractor 918. The subtractor 918 subtracts each pixel from the normalized target image and the normalized reference image to produce a differential value that represents any differences between the normalized target image and the normalized reference image. As described above with reference to FIG. 7, 95% of all values in a short-exposure image and a long-exposure image have a difference of 64, which can be represented in 6 bits.

In one illustrative example, the multiplier 916 outputs the normalized target image to a comparator 920 that compares pixels in the normalized target image to a maximum value of the reference image. If the value of a pixel in the normalized target image is greater than the maximum value of the reference image, the comparator 920 is configured to control a switch 922 (e.g., a multiplexer) to output the differential values from the subtractor 918 or the maximum value of the reference image.

Alternatively or additionally, the pixel differentiator 910 can be configured to use a different reference image, and the pixel differentiator 910 can be modified to normalize the reference image and the target image. For example, if a short-exposure image is used as the reference image in the pixel differentiator 910 and a long-exposure image is the target image, the short-exposure image would be normalized (e.g., multiplied based on an exposure ratio) with respect to the long-exposure image. Table 1 illustrates pseudocode implemented by the pixel differentiator 910 for determining a pixel difference for a short-exposure image being the reference image.

TABLE 1

```
if (exposureRatio * (shortExposureImage-BlackLevel >= MaxValue))
{
    pixelDifference = Max(longExposureImage)
} else {
    var normalizedVal = exposureRatio * (shortExposureImage -
      blackLevel);
    pixelDifference = longExposureImage - blackLevel -
      normalizedVal;
}
```

The pixel differentiator 910 outputs the pixel difference to the pixel encoder 950, which includes a sign detector 952 that is configured to determine a sign (e.g., either positive or negative) associated with the pixel difference. The pixel encoder 950 also includes a value detector 954 that computes an absolute value (e.g., removes the sign) and the absolute value is provided to a comparator 956. The comparator 956 compares the absolute value to a threshold value. The threshold value is a maximum pixel difference that is used to determine the output value of the pixel encoder 950.

In some aspects, the output of the comparator 956 is provided as an control input into a switch 958 (e.g., a multiplexer) for controlling a primary output and a switch 960 for controlling a second output. If the threshold is greater than the pixel difference, switch 958 provides the primary output Y, which is the pixel difference and the switch provides a value of zero. A combiner 962 receives the sign from the sign detector 952, the primary output from the switch 958, and the secondary output from the switch 960 and packages the values in an encoded value, but omits the secondary output due to the size being zero. Because the threshold is less than the pixel difference, the value of the primary output is reduced in size (e.g., from 16-bits to 6-bits).

If the threshold is less than pixel difference, which is an uncommon occurrence as described above in FIG. 7, the switch 958 provides the threshold value as an output to the combiner 962, and the switch 960 provides an output of the pixel difference less the threshold to the combiner 962. The combiner 962 in this example is configured to package the received values into an encoded value. In this example, the package does not reduce the size because the package includes the secondary output. Table 2 below illustrates pseudocode implemented by the pixel encoder 950 and indicates that the secondary output is only provided when the pixel difference is greater than or equal to the upper boundary of the threshold.

TABLE 2

```
If (pixelDifference >= threshold)
{
    primaryOutput = threshold;
    secondaryOutput = pixelDifference - threshold;
} else {
    primaryOutput = pixelDifference;
    secondaryOutput = null; // or 0 or other undefined value to indicate
      // secondary output is not used
}
```

Figure 10:
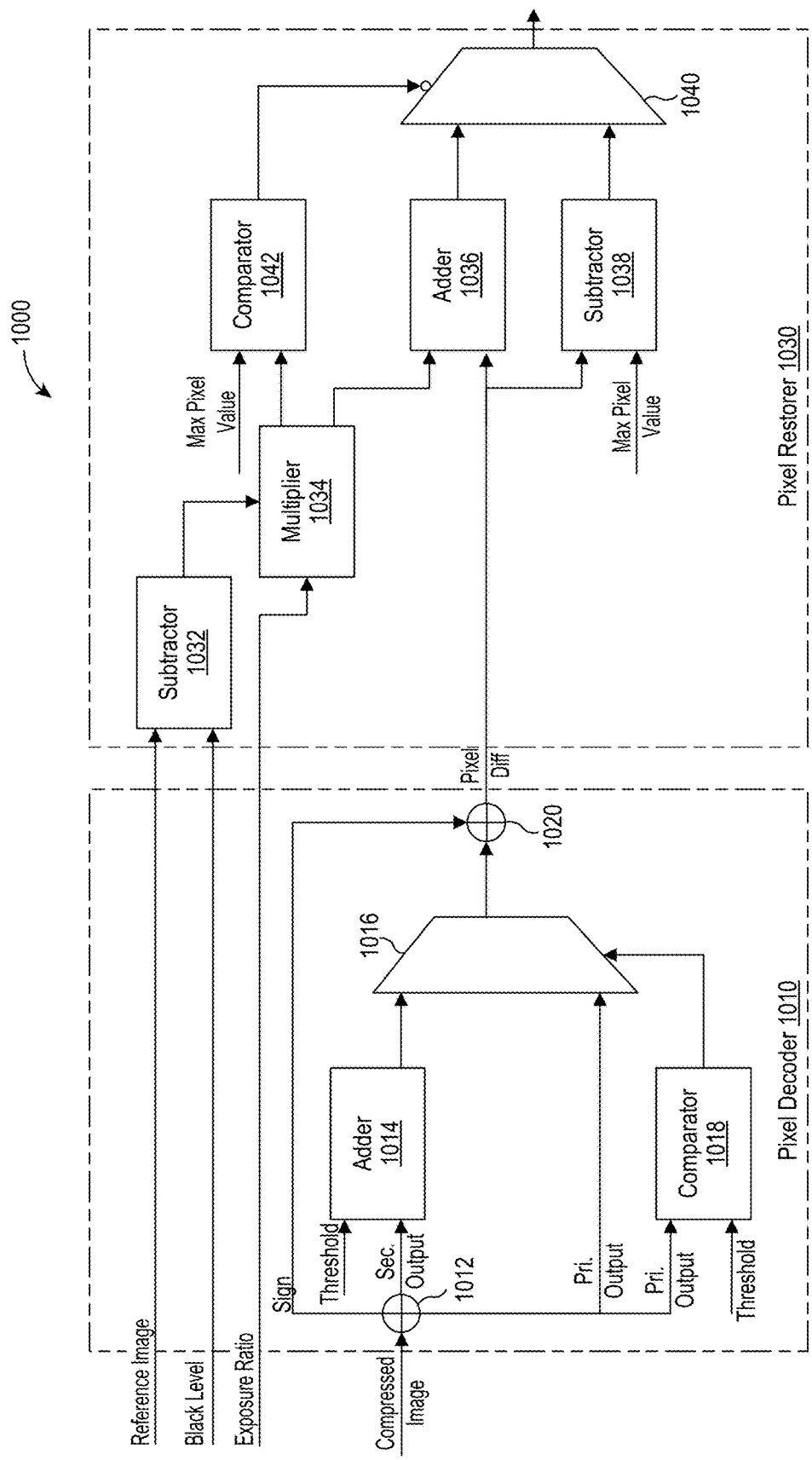
FIG. 10 is a block diagram of a decompression engine that is configured to losslessly decompress at least one compressed image during HDR image synthesis in accordance with some aspects of the disclosure.

FIG. 10 is a block diagram of a decompressor 1000 that is configured to losslessly decompress at least one compressed image during HDR image synthesis in accordance with some aspects of the disclosure. In some aspects, the decompressor 1000 is configured to receive an encoded pixel stream that is encoded based on the pixel difference between a reference image and a target image to restore the target image. The decompressor 1000 includes a pixel decoder 1010 configured to restore a pixel difference and a pixel restorer 1030 configured to restore values of the target image from a compressed image and the reference image.

The pixel decoder 1010 includes a divider 1012 that is configured to separate the various discrete values of the compressed image. For example, each pixel in the compressed image comprises a sign and a secondary output based on a pixel difference and may include a primary output. The divider is configured to provide the secondary output to an adder 1014 that adds the threshold value to the secondary output, and the output of the adder 1014 may correspond pixel difference between a reference image and a target image. The pixel difference from the adder 1014 and the primary output are provided as inputs into a switch 1016. The primary output is also provided to a comparator 1018 that compares the primary output to the threshold and provides a control input to control the output of the switch 1016. In one illustrative example, if the primary output is greater than or equal to the threshold, the comparator 1018 controls the switch 1016 to output the primary output because the value is not encoded. When the primary output is less than the threshold, the output of the adder 1014 corresponds to the pixel difference between the reference image and the compressed image and controls the switch 1016 to output the pixel difference. The output of the switch 1016 and a sign provided by the divider 1012 are received at a combiner 1020, which generates an output of the pixel decoder 1010. In some aspects, the output of the pixel decoder 1010 is either a differential pixel value (e.g., +30, −30) that is encoded to represent a difference associated with a single pixel, or represents a value of a single pixel. Table 3 below illustrates pseudocode implemented by the pixel decoder 1010 according to some aspects of the disclosure.

TABLE 3

```
If (primaryOutput >= threshold)
{
    pixelDifference = secondaryOutput + threshold;
} else {
    pixelDifference = primaryOutput;
}
```

In some aspects, the pixel restorer 1030 is configured to reconstruct the target image based on the pixel difference. In one illustrative aspect, the pixel restorer 1030 comprises a subtractor 1032 that subtracts the black level from the pixels in the reference image. In one illustrative example, the output of the subtractor 1032 is provided to a multiplier and is multiplied by the exposure ratio. In some aspects, the exposure ratio is based on a ratio of the reference image to the longest exposure image. In this case, the reference image is the longest exposure image and the ratio would be 1.

The multiplier 1034 normalizes the reference image and the normalized reference image is provided to an adder 1036, which receives and adds the pixel difference to the normalized reference image. The pixel difference is also provided to a subtractor 1038 that is configured to receive a maximum pixel value. The output of the adder 1036 and the subtractor 1038 are provided to a switch 1040 that is configured to select the output based on a comparator 1042. In particular, the comparator 1042 receives and compares the maximum pixel value and the normalized reference image. If a pixel of the reference image is greater than or equal to a maximum pixel value, the comparator 1042 controls the switch 1040 to output from the subtractor 1038. The output from the subtractor is selected when the pixel cannot be encoded because its value falls outside of the threshold. If a pixel of the reference image is less than the maximum pixel value, the comparator 1042 is configured to control the switch 1040 to output the value from the adder 1036. In some aspects, the output from the adder 1036 is selected when the pixel difference is less than the threshold (e.g., maximum pixel difference of ±32) and is encoded by the compressor. The switch 1040 is configured to select between encoded values in the compressed image and non-encoded values in the compressed image to fully recreate the target image without any loss. Table 4 below illustrates pseudeocode that is implemented by the pixel restorer 1030 and illustrates selecting the value of pixels for the decompressed image based on whether the

TABLE 4

```
var normalizedReference = exposureRatio * (referenceImage -
blackLevel);
if (normalizedReference >= Max(targetImage))
{
    decompressedImage = Max(targetImage) - pixelDifference;
} else {
    decompressedImage = pixelDifference + normalizedReference +
    blackLevel;
}
```

The values of the compressed image can either represent an encoded value when a difference of a pixel in the target image and the corresponding pixel in the reference image is within a range (e.g., ±32, ±64, etc.).

Figure 11:
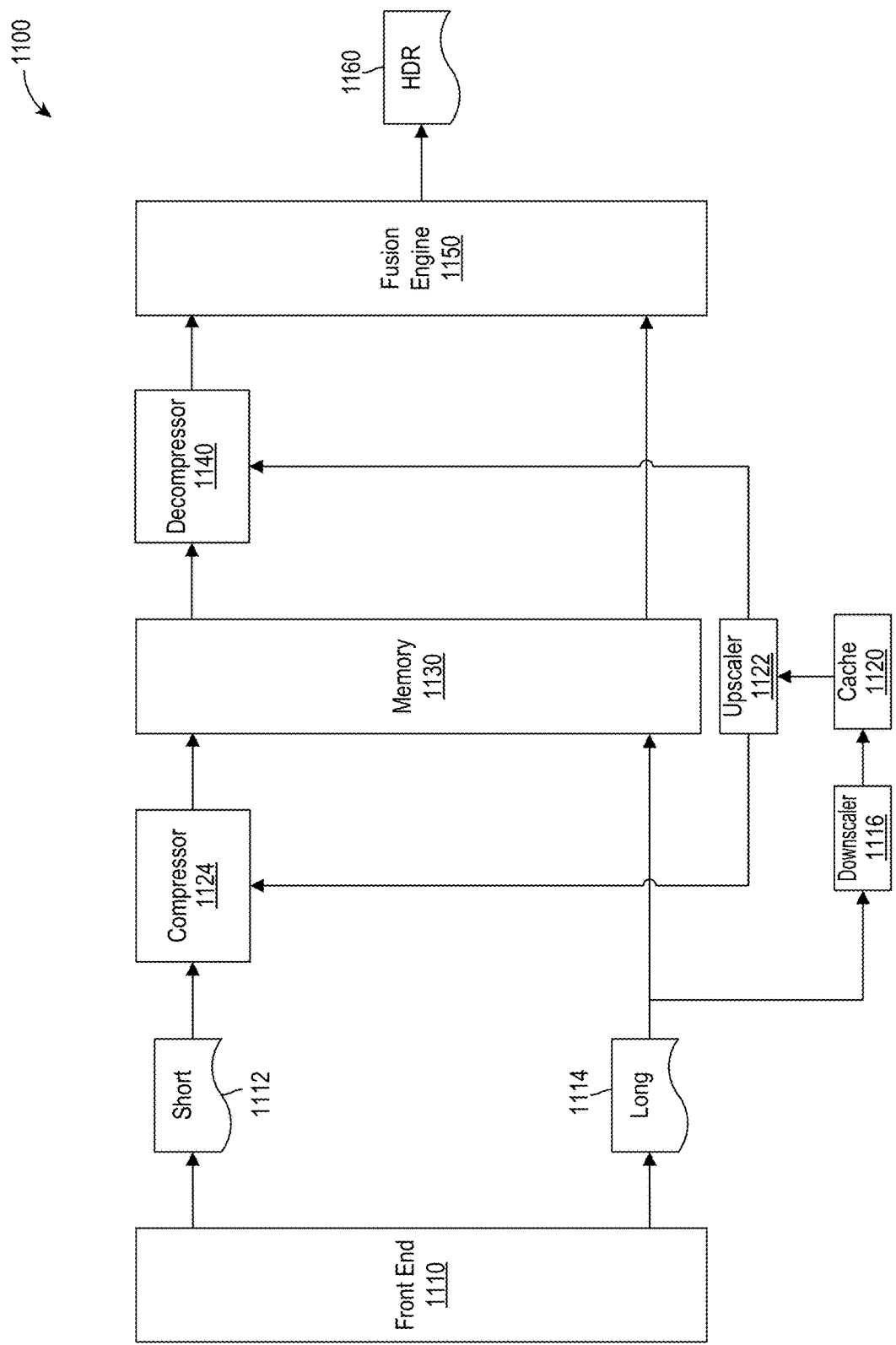
FIG. 11 is a diagram that illustrates another image capturing system that compresses at least one image during HDR image synthesis to reduce bandwidth and power in accordance with some aspects of the disclosure.

FIG. 11 is a diagram that illustrates another image capturing system 1100 of an ISP that compresses at least one image during HDR image synthesis to reduce bandwidth and power in accordance with some aspects of the disclosure. In some aspects, the front end 1110 of the ISP is configured to receive at least a short-exposure image 1112 and long-exposure image 114 from an image sensor (not shown).

The long-exposure image 1114 is configured to be the reference image and is provided to a downscaler 1116 that reduces the size of the long-exposure image 1114 and stores the downscaled long-exposure image 1114 in a cache 1120. In some aspects, the ISP may be configured to have a limited cache to reduce the costs associated with the ISP, and value tiers of ISPs may reduce the cache size. In such cases, the size of the long-exposure image 1114 may be large to be stored in the cache 1120 and a downscaled version of the long-exposure image 1114 can be fit into the cache 1120. In one illustrative aspect, the pixels of the long-exposure image 1114 can be grouped and averaged to reduce the size to allow the cache 1120 to store the reference image. For example, a 2×2 pixel grid can be averaged, which reduces the number of pixels by a factor of four and can enable the downscaled long-exposure image 1114 to be stored within the cache 1120. The downscaling in this example is described as an average, but any suitable downscaling technique such as nearest neighbor resampling, bilinear resampling, bicubic resampling, sinc resampling, spline resampling, Lanczos resampling, and so forth. When the compressor 1124 receives the short-exposure image 1112, the compressed long-exposure image 1114 is read out of the cache 1120 and upscaled by an upscaler 1122, and the compressed short-exposure image 1112 is stored in a memory along with the uncompressed long-exposure image 1114.

The uncompressed short-exposure image 1112 is read out of the memory device 1130 and provided to the decompressor 1140 with the upscaled reference image from the upscaler 1122. In some aspects, the decompressor 1140 restores the values of the short-exposure image 1112 based on the downscaled reference image. In this case, pixels in the decompressed short-exposure image 1112 will lose some quality based on the averaging applied to the reference image. The fusion engine 1150 receives the long-exposure image 1114 and the short-exposure image 1112 is decompressed using the downscaled reference image and synthesizes the images into an HDR image 1160.

In some aspects, the resulting HDR image 1160 will lose some quality because pixels are restored based on a downscaled version of the reference image. In some cases, the fusion engine 1150 may be configured to synthesize the short-exposure image and the long-exposure image based on the resampling (e.g., downscaling, upscaling), which can reduce any artifacts that occur.

Figure 12:
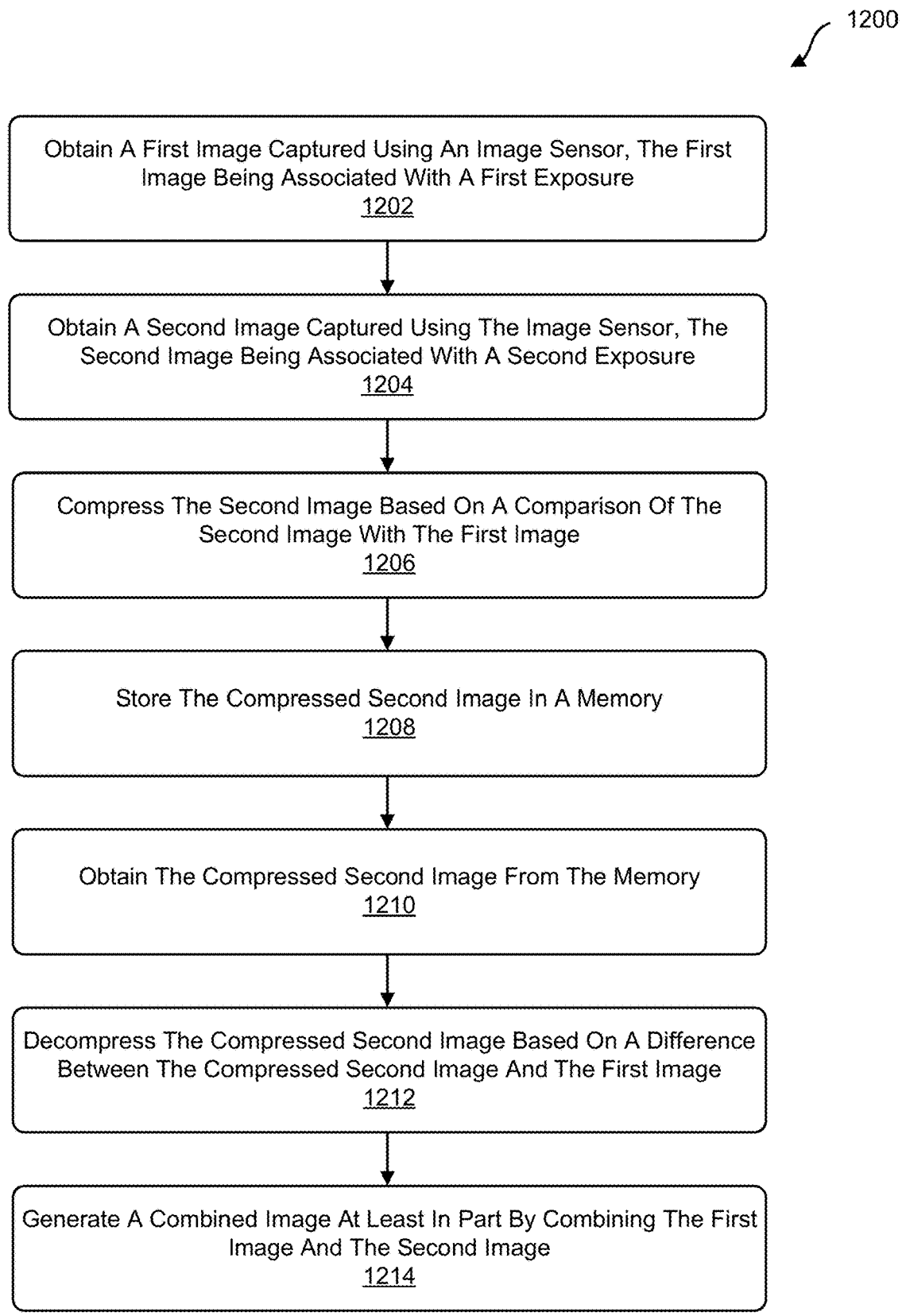
FIG. 12 is a flowchart illustrating an example of a method for compressing images during HDR image synthesis, in accordance with aspects of the present disclosure.

FIG. 12 is a flowchart illustrating an example of a method 1200 for compressing images during HDR image synthesis, in accordance with certain aspects of the present disclosure. The method 1200 can be performed by a computing device (or a component thereof, such as a chipset) having an image sensor, such as a mobile wireless communication device, a camera, an XR device, a wireless-enabled vehicle, or another computing device. In one illustrative example, a computing system 1500 can be configured to perform all or part of the method 1200. In one illustrative example, an ISP such as the ISP 254 can be configured to perform all or part of the method.

At block 1202, the computing device (or component thereof) may obtain a first image captured using an image sensor. The first image is associated with a first exposure. In some aspects, the computing device (or component thereof) may cause the first image to be stored in a cache. For instance, the computing device (or component thereof) may downsample the first image and may cause the downsampled first image to be stored in the cache. The computing device (or component thereof) may further upsample the downsampled first image into a lossy first image.

At block 1204, the computing device (or component thereof) may obtain a second image captured using the image sensor. The second image is associated with a second exposure. For example, the second exposure may be less than the first exposure.

At block 1206, the computing device (or component thereof) may compress the second image based on a comparison of the second image with the first image. The compression of the second image may be lossless. In one illustrative example, to compress the second image, computing device (or component thereof) may compute a pixel difference between pixels of the first image and pixels of the second image and may determine a compressed value for at least a portion of the pixels in the second image based the pixel difference. In some cases, to compute the pixel difference, the computing device (or component thereof) may normalize the first image and the second image based on a minimum pixel value associated with the image sensor. In some examples, the computing device (or component thereof) may multiply the second image by an exposure ratio associated with the second image and the first image to generate a modified image. In some cases, the computing device (or component thereof) may subtract a value of a pixel in the modified image from a maximum value in the first image. In one illustrative example, the value of the pixel of the modified image is greater than or equal to the maximum value, and the pixel difference corresponds to the maximum value based on the value of the pixel of the modified image being greater than or equal to the maximum value. In another illustrative example, the value of the pixel of the modified image is less than the maximum value, and the pixel difference corresponds to the difference between the value of the pixel in the modified image and the maximum value based on the value of the pixel of the modified image being less than the maximum value.

In some aspects, to determine the compressed value for at least the portion of pixels in the second image, the computing device (or component thereof) may compare the pixel difference to a threshold. In one illustrative example, based on a determination that the pixel difference is less than or equal to the threshold, the computing device (or component thereof) may use a value of the pixel difference as a compressed value for at least the portion of the pixels in the second image. In one illustrative example, based on a determination that the pixel difference is greater than the threshold, the computing device (or component thereof) may use a value of at least one pixel in the second image as a compressed value for at least the portion of the pixels in the second image. In some cases, the value of the at least one pixel used as the compressed value includes the pixel difference.

At block 1208, the computing device (or component thereof) may store the compressed second image in a memory. At block 1210, the computing device (or component thereof) may obtain the compressed second image from the memory.

At block 1212, the computing device (or component thereof) may decompress the compressed second image based on a difference between the compressed second image and the first image. In some cases, to decompress the compressed second image, the computing device (or component thereof) may determine a pixel difference of pixels within the compressed second image. The computing device (or component thereof) may sum the pixel difference of the pixels in the compressed second image with pixels in the first image. In some examples, to determine of the pixel difference, the computing device (or component thereof) may add a threshold to a value of a pixel within the compressed second image based on whether the value of the pixel is greater than the threshold. In some aspects, to compress the second image, the computing device (or component thereof) may compute a pixel difference for pixels between the lossy first image and the second image. The computing device (or component thereof) may determine a compressed value for at least a portion of pixels in the second image based the pixel difference. In some cases, to decompress the compressed second image, the computing device (or component thereof) may determine a pixel difference of pixels within the compressed second image and may sum the pixel difference of the pixels in the compressed second image with pixels in the lossy first image.

At block 1214, the computing device (or component thereof) may generate a combined image at least in part by combining the first image and the second image. In some cases, the combined image is a high dynamic range (HDR) image.

Figure 13:
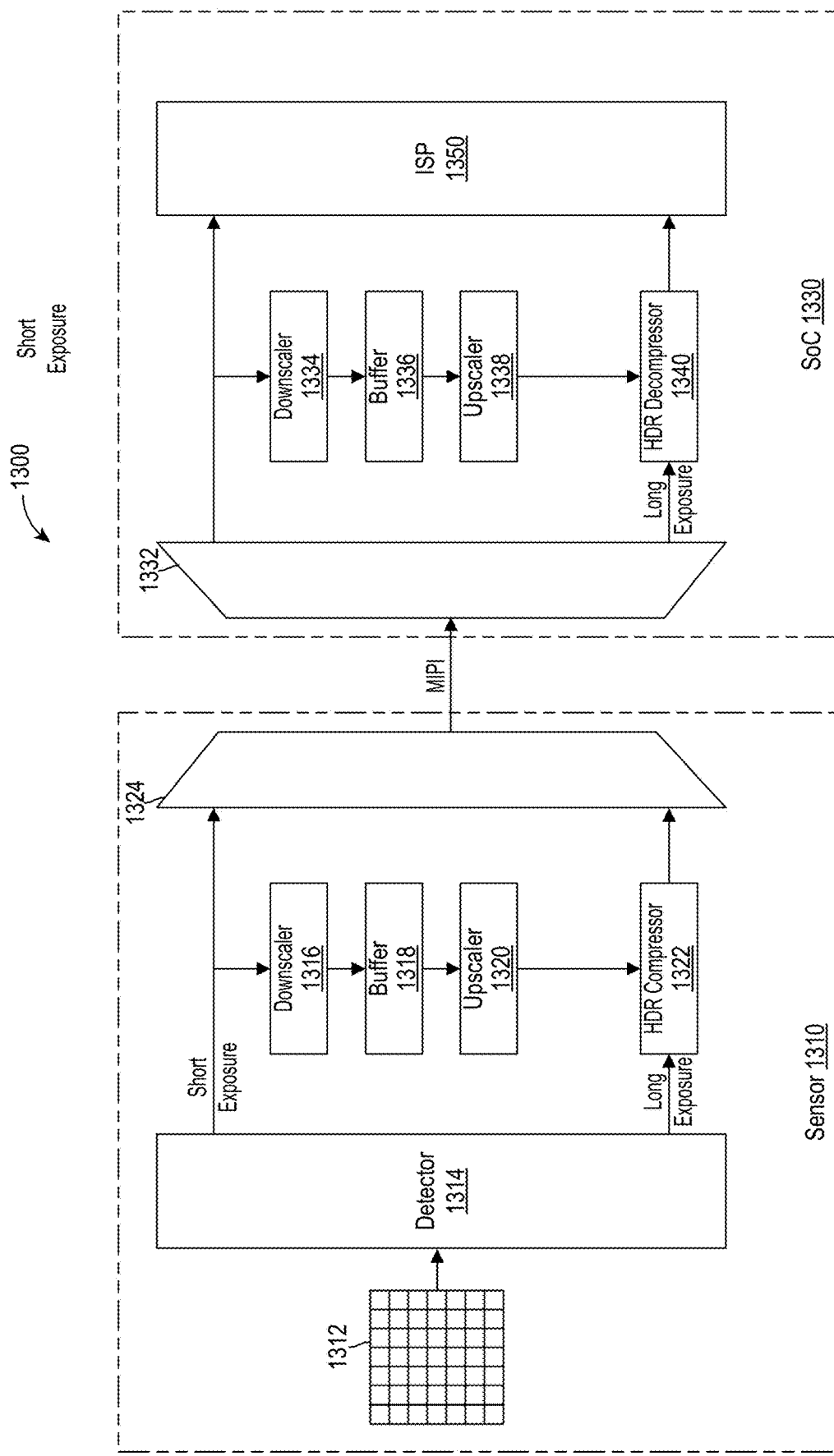
FIG. 13 is a diagram that illustrates another image capturing system that compresses at least one image in an image sensor to reduce bandwidth and power of an HDR image synthesis process in accordance with some aspects of the disclosure.

FIG. 13 is a diagram that illustrates another image capturing system 1300 that compresses at least one image in an image sensor to reduce the bandwidth and power of an HDR image synthesis process in accordance with some aspects of the disclosure. The image capturing system includes an image sensor 1310 that is configured to receive light, convert the light into electrical signals that are digitized into a raw digital image, and transmit the raw digital image to a system on chip (SoC) 1330.

In one illustrative example, the image sensor 1310 includes a pixel array 1312 of photosensors that are configured to detect light received from a lens and detect light incident to the photosensors. In one aspect, a Bayer filter may be positioned over the photosensors to enable photosensors to detect a specific wavelength (e.g., a color) of light. A detector 1314 is configured to read the analog values of the individual photosensors and create a raw digital image in the form of digital pixel values. For example, the detector 1314 can include an ADC that reads individual analog values of the light intensity at each photosensor and creates a value for an individual pixel based on a combination of different photosensors. For example, an individual pixel comprises at least a photosensor for red light, a photosensor for green light, and a photosensor for blue light. In another illustrative example, an individual pixel can use other color combinations such as a cyan, magenta, and yellow combination.

The detector 1314 is configured to read out images from the pixel array 1312 while light is exposing the pixel array 1312 and produces a short-exposure image, which will be the reference image because the short-exposure image is available first. The short-exposure image is provided to a downscaler 1316 which reduces the size of the short-exposure image because the image sensor 1310 has limited buffer 1318 capacity. A switch 1324 causes the short-exposure image to be provided to the SoC 1330. When the long-exposure image is being read out by the detector 1314, the long-exposure image is provided to an HDR compressor 1322 and an upscaler 1320 reads the buffer 1308 to retrieve and upscale the downscaled reference image into the reference image. The HDR compressor 1322 is configured to compress the long-exposure image using the difference between the reference image and the target image, which is the long-exposure image in this illustrative example. The compressed long-exposure image is provided to the switch 1324 and transmitted to the SoC 1330.

In some aspects, a switch 1332 of the SoC 1330 is configured to control the flow of the images received by the image sensor 1310. In one illustrative example, the switch 1324 and the switch 1332 can be implemented by virtual channels that do not require any hardware changes and provide a logical control flow of the various images. When the switch 1332 receives the short-exposure image, the switch 1332 provides the short-exposure image to an ISP 1350 and a downscaler 1334. The downscaler 1334 is configured to downscale the reference image (e.g., short-exposure image) and store the downscaled image in a buffer 1336. When the switch 1332 receives the compressed long-exposure image, the switch 1332 provides the compressed long-exposure image to an HDR decompressor 1340. The HDR decompressor 1340 requests the reference image, and an upscaler 1338 retrieves and upscales the downscaled reference image into the reference image and provides the reference image to the HDR decompressor 1340. In some aspects, the HDR decompressor 1340 is configured to use the pixels in the reference image and the pixel differences in the compressed long-exposure image to restore the long-exposure image as described above with reference to FIG. 10.

In some aspects, the ISP 1350 receives the short-exposure image and the long-exposure image and synthesizes an HDR image as described above. Although the illustrative example uses the short-exposure image as the reference image, the long-exposure image may also be used as a reference image. In some other aspects, a buffer size of an ISP or an image sensor may have sufficient storage capacity to store an image without downscaling and various devices, functions, or modules illustrated in FIG. 13 may be omitted. For example, a 2 nanometer (nm) process node may be able to integrate a sufficiently large buffer into an image sensor, and downscaling the reference image may not be necessary.

In some aspects, the process of compressing the long-exposure image within the image sensor 1310 provides bandwidth saving by reducing the need to transmit complete images using a MIPI connection. This reduces bandwidth consumption and can enable higher frame rates to be achieved using the same connection. In addition, reducing the amount of content transmitted across the MIPI connection incurs power savings, which yields improvements to battery and thermal performance.

Figure 14:
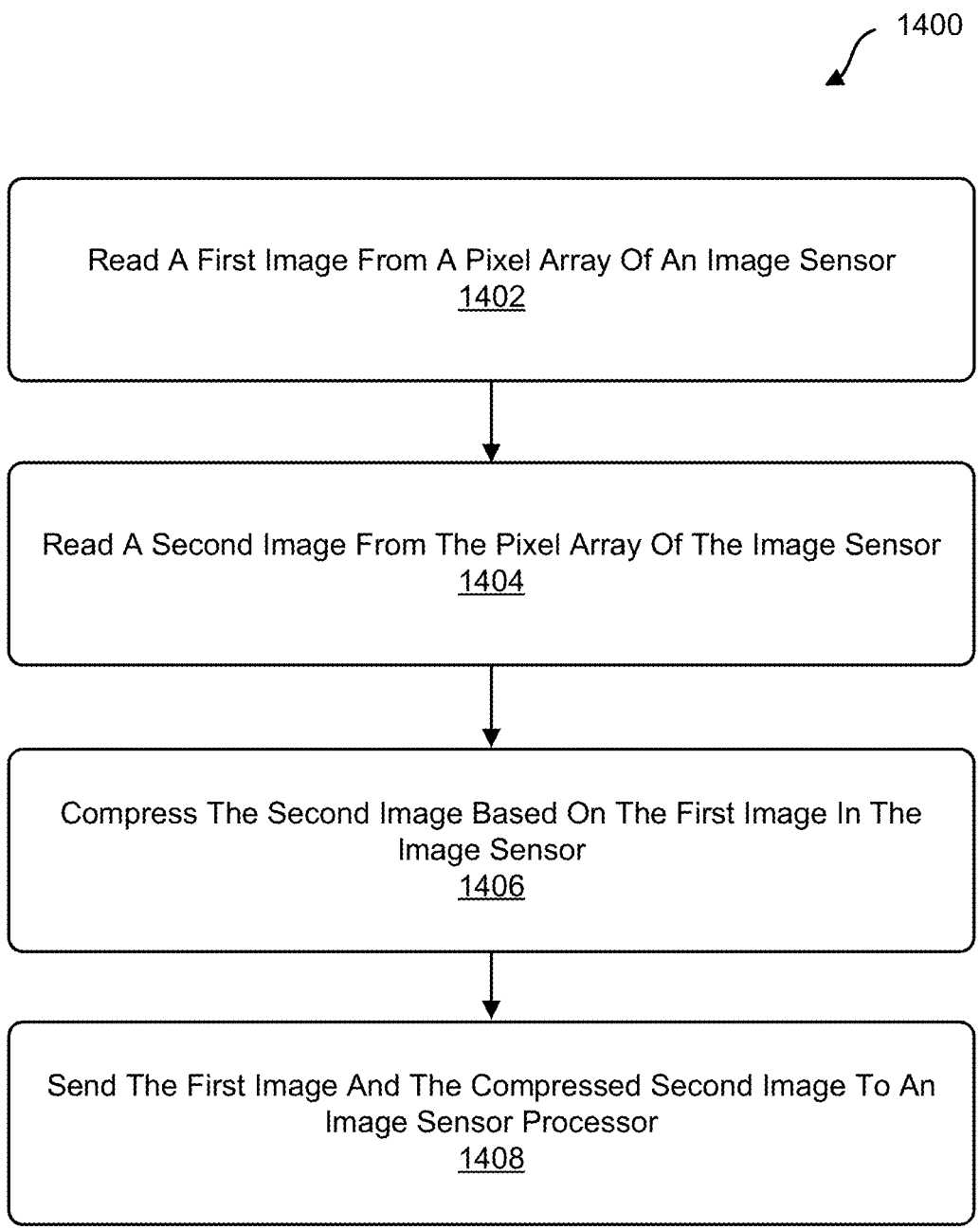
FIG. 14 is a flowchart illustrating another example of a method for compressing images during HDR image synthesis, in accordance with aspects of the present disclosure.

FIG. 14 is a flowchart illustrating an example of a method 1400 for compressing images during HDR image synthesis, in accordance with certain aspects of the present disclosure. The method 1400 can be performed by a computing device (or a component thereof, such as a chipset) having an image sensor, such as a mobile wireless communication device, a camera, an XR device, a wireless-enabled vehicle, or other computing device. In one illustrative example, a computing system 1500 can be configured to perform all or part of the method 1400. In one illustrative example, an ISP such as the ISP 254 can be configured to perform all or part of the method 1400.

At block 1402, the computing device (or component thereof) may read a first image from a pixel array of an image sensor. At block 1404, the computing device (or component thereof) may read a second image from the pixel array. For instance, the first image may have a shorter exposure than the second image. In some examples, the computing device (or component thereof) may start reading of the second image during the reading of the first image. In some cases, the computing device (or component thereof) may downsample the first image and may store the downsampled first image in a line buffer of the image sensor. Based on a corresponding portion of the second image being read out from the pixel array, the computing device (or component thereof) may upscale a portion of the downsampled first image and compressing the second image based on the upscaled portion.

At block 1406, the computing device (or component thereof) may compress the second image based on the first image, for example using the techniques described herein. At block 1407, the computing device (or component thereof) may send the first image and the compressed second image to an image sensor processor (ISP). For instance, the ISP may be configured to decompress the second image based on a comparison of the compressed second image and the first image.

In some examples, the processes described herein (e.g., methods 1200 and 1400, and/or other process described herein) may be performed by a computing device or apparatus. In one example, the methods 1200 and 1400 can be performed by a computing device (e.g., image capture and processing system 200 in FIG. 2) having a computing architecture of the computing system 1500 shown in FIG. 15.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the methods described herein, including the methods 1200 and 1400. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, a network interface configured to communicate and/or receive the data, any combination thereof, and/or other component(s). The network interface may be configured to communicate and/or receive IP-based data or other type of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The methods 1200 and 1400 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The methods 1200 and 1400, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1500 includes at least one processing unit (CPU or processor) 1510 and connection 1505 that couples various system components including system memory 1515, such as ROM 1520 and RAM 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAIVI/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for generating one or more images, the apparatus comprising: at least one memory; and at least one processor coupled to the at least one memory and configured to: obtain a first image captured using an image sensor, the first image being associated with a first exposure; obtain a second image captured using the image sensor, the second image being associated with a second exposure; compress the second image based on a comparison of the second image with the first image; store the compressed second image in a memory; obtain the compressed second image from the memory; decompress the compressed second image based on a difference between the compressed second image and the first image; and generate a combined image at least in part by combining the first image and the second image.

Aspect 2. The apparatus of Aspect 1, wherein the compression of the second image is lossless.

Aspect 3. The apparatus of any of Aspects 1 to 2, wherein the second exposure is less than the first exposure, and wherein the combined image is a high dynamic range (HDR) image.

Aspect 4. The apparatus of any of Aspects 1 to 3, wherein, to compress the second image, the at least one processor is configured to: compute a pixel difference between pixels of the first image and pixels of the second image; and determine a compressed value for at least a portion of the pixels in the second image based the pixel difference.

Aspect 5. The apparatus of Aspect 4, wherein, to compute the pixel difference, the at least one processor is configured to: normalize the first image and the second image based on a minimum pixel value associated with the image sensor.

Aspect 6. The apparatus of any of Aspects 4 or 5, wherein the at least one processor is configured to: multiply the second image by an exposure ratio associated with the second image and the first image to generate a modified image.

Aspect 7. The apparatus of Aspect 6, wherein the at least one processor is configured to: subtract a value of a pixel in the modified image from a maximum value in the first image.

Aspect 8. The apparatus of Aspect 7, wherein the value of the pixel of the modified image is greater than or equal to the maximum value, and wherein the pixel difference corresponds to the maximum value based on the value of the pixel of the modified image being greater than or equal to the maximum value.

Aspect 9. The apparatus of Aspect 7, wherein the value of the pixel of the modified image is less than the maximum value, and wherein the pixel difference corresponds to the difference between the value of the pixel in the modified image and the maximum value based on the value of the pixel of the modified image being less than the maximum value.

Aspect 10. The apparatus of Aspect 4, wherein, to determine the compressed value for at least the portion of pixels in the second image, the at least one processor is configured to: compare the pixel difference to a threshold; and based on a determination that the pixel difference is less than or equal to the threshold, use a value of the pixel difference as a compressed value for at least the portion of the pixels in the second image.

Aspect 11. The apparatus of Aspect 4, wherein, to determine the compressed value for at least the portion of pixels in the second image, the at least one processor is configured to: compare the pixel difference to a threshold; and based on a determination that the pixel difference is greater than the threshold, use a value of at least one pixel in the second image as a compressed value for at least the portion of the pixels in the second image.

Aspect 12. The apparatus of Aspect 11, wherein the value of the at least one pixel used as the compressed value includes the pixel difference.

Aspect 13. The apparatus of any of Aspects 1 to 12, wherein, to decompress the compressed second image, the at least one processor is configured to: determine a pixel difference of pixels within the compressed second image; and sum the pixel difference of the pixels in the compressed second image with pixels in the first image.

Aspect 14. The apparatus of Aspect 13, wherein, to determine of the pixel difference, the at least one processor is configured to: add a threshold to a value of a pixel within the compressed second image based on whether the value of the pixel is greater than the threshold.

Aspect 15. The apparatus of any of Aspects 1 to 14, wherein the at least one processor is configured to: cause the first image to be stored in a cache.

Aspect 16. The apparatus of any of Aspects 1 to 15, wherein the at least one processor is configured to: downsample the first image; cause the downsampled first image to be stored in a cache; and upsample the downsampled first image into a lossy first image.

Aspect 17. The apparatus of Aspect 16, wherein, to compress the second image, the at least one processor is configured to: compute a pixel difference for pixels between the lossy first image and the second image; and determine a compressed value for at least a portion of pixels in the second image based the pixel difference.

Aspect 18. The apparatus of any of Aspects 16 or 17, wherein, to decompress the compressed second image, the at least one processor is configured to: determine a pixel difference of pixels within the compressed second image; and sum the pixel difference of the pixels in the compressed second image with pixels in the lossy first image.

Aspect 19. A method of generating an image, the method comprising: obtaining a first image captured using an image sensor, the first image being associated with a first exposure; obtaining a second image captured using the image sensor, the second image being associated with a second exposure; compressing the second image based on a comparison of the second image with the first image; storing the compressed second image in a memory; obtaining the compressed second image from the memory; decompressing the compressed second image based on a difference between the compressed second image and the first image; and generating a combined image at least in part by combining the first image and the second image.

Aspect 20. The method of Aspect 19, wherein the compression of the second image is lossless.

Aspect 21. The method of any of Aspects 19 to 20, wherein the second exposure is less than the first exposure, and wherein the combined image is a high dynamic range (HDR) image.

Aspect 22. The method of any of Aspects 19 to 21, wherein compressing the second image comprises: computing a pixel difference between pixels of the first image and pixels of the second image; and determining a compressed value for at least a portion of the pixels in the second image based the pixel difference.

Aspect 23. The method of Aspect 22, wherein computing the pixel difference comprises: normalizing the first image and the second image based on a minimum pixel value associated with the image sensor.

Aspect 24. The method of any of Aspects 22 or 23, further comprising: multiplying the second image by an exposure ratio associated with the second image and the first image to generate a modified image.

Aspect 25. The method of Aspect 24, further comprising: subtracting a value of a pixel in the modified image from a maximum value in the first image.

Aspect 26. The method of Aspect 25, wherein the value of the pixel of the modified image is greater than or equal to the maximum value, and wherein the pixel difference corresponds to the maximum value based on the value of the pixel of the modified image being greater than or equal to the maximum value.

Aspect 27. The method of Aspect 25, wherein the value of the pixel of the modified image is less than the maximum value, and wherein the pixel difference corresponds to the difference between the value of the pixel in the modified image and the maximum value based on the value of the pixel of the modified image being less than the maximum value.

Aspect 28. The method of Aspect 22, wherein determining the compressed value for at least the portion of pixels in the second image comprises: comparing the pixel difference to a threshold; and based on a determination that the pixel difference is less than or equal to the threshold, using a value of the pixel difference as a compressed value for at least the portion of the pixels in the second image.

Aspect 29. The method of Aspect 22, wherein determining the compressed value for at least the portion of pixels in the second image comprises: comparing the pixel difference to a threshold; and based on a determination that the pixel difference is greater than the threshold, using a value of at least one pixel in the second image as a compressed value for at least the portion of the pixels in the second image.

Aspect 30. The method of Aspect 29, wherein the value of the at least one pixel used as the compressed value includes the pixel difference.

Aspect 31. The method of any of Aspects 19 to 30, wherein decompressing the compressed second image comprises: determining a pixel difference of pixels within the compressed second image; and summing the pixel difference of the pixels in the compressed second image with pixels in the first image.

Aspect 32. The method of Aspect 31, wherein determining of the pixel difference comprises: adding a threshold to a value of a pixel within the compressed second image based on whether the value of the pixel is greater than the threshold.

Aspect 33. The method of any of Aspects 19 to 32, further comprising: storing the first image in a cache.

Aspect 34. The method of any of Aspects 19 to 33, further comprising: downsampling the first image; storing the downsampled first image in a cache; and upsampling the downsampled first image into a lossy first image.

Aspect 35. The method of Aspect 34, wherein compressing the second image comprises: computing a pixel difference for pixels between the lossy first image and the second image; and determining a compressed value for at least a portion of pixels in the second image based the pixel difference.

Aspect 36. The method of Aspect 34 or 35, wherein decompressing the compressed second image comprises: determining a pixel difference of pixels within the compressed second image; and summing the pixel difference of the pixels in the compressed second image with pixels in the lossy first image.

Aspect 37. An apparatus for processing one or more images, the apparatus comprising: at least one memory; and at least one processor coupled to the at least one memory and configured to: read a first image from a pixel array of an image sensor; read a second image from the pixel array; compress the second image based on the first image; and send the first image and the compressed second image to an image sensor processor (ISP).

Aspect 38. The apparatus of Aspect 37, wherein the at least one processor is configured to: downsample the first image and storing the downsampled first image in a line buffer of the image sensor; and based on a corresponding portion of the second image being read out from the pixel array, upscale a portion of the downsampled first image and compressing the second image based on the upscaled portion.

Aspect 39. The apparatus of any of Aspects 37 to 38, wherein the at least one processor is configured to start reading of the second image during the reading of the first image, and wherein the first image has a shorter exposure than the second image.

Aspect 40. The apparatus of any of Aspects 37 to 39, wherein the ISP is configured to decompress the second image based on a comparison of the compressed second image and the first image.

Aspect 41. A method of processing one or more images, the method comprising: reading a first image from a pixel array of an image sensor; reading a second image from the pixel array; compressing the second image based on the first image; and sending the first image and the compressed second image to an image sensor processor (ISP).

Aspect 42. The method of Aspect 41, further comprising: downsampling the first image and storing the downsampled first image in a line buffer of the image sensor; and based on a corresponding portion of the second image being read out from the pixel array, upscaling a portion of the downsampled first image and compressing the second image based on the upscaled portion.

Aspect 43. The method of any of Aspects 41 to 42, wherein the reading of the second image starts during the reading of the first image, and wherein the first image has a shorter exposure than the second image.

Aspect 44. The method of any of Aspects 41 to 43, wherein the ISP is configured to decompress the second image based on a comparison of the compressed second image and the first image.

Aspect 45. A non-transitory computer-readable medium having stored thereon instructions that, when executed by one or more processors, cause the one or more processors to perform operations according to any of Aspects 19 to 36.

Aspect 46. An apparatus for generating one or more images, the apparatus including one or more means for performing operations according to any of Aspects 19 to 36.

Aspect 47. A non-transitory computer-readable medium having stored thereon instructions that, when executed by one or more processors, cause the one or more processors to perform operations according to any of Aspects 41 to 44.

Aspect 48. An apparatus for processing one or more images, the apparatus including one or more means for performing operations according to any of Aspects 41 to 44.

What is claimed is:

1. An apparatus for generating one or more images, the apparatus comprising:
at least one memory; and
at least one processor coupled to the at least one memory and configured to:
obtain a first image captured using an image sensor, the first image being associated with a first exposure;
obtain a second image captured using the image sensor, the second image being associated with a second exposure;
compress the second image based on a comparison of the second image with the first image, wherein to compress the second image, the at least one processor is configured to:
compute a pixel difference between pixels of the first image and pixels of the second image by normalizing the first image and the second image based on a minimum pixel value associated with the image sensor; and determine a compressed value for at least a portion of the pixels in the second image based on the pixel difference;

store the compressed second image in a memory;

obtain the compressed second image from the memory;

decompress the compressed second image based on a difference between the compressed second image and the first image; and generate a combined image at least in part by combining the first image and the second image.

2. The apparatus of claim 1, wherein the compression of the second image is lossless.

3. The apparatus of claim 1, wherein the second exposure is less than the first exposure, and wherein the combined image is a high dynamic range (HDR) image.

4. The apparatus of claim 1, wherein the at least one processor is configured to:

multiply the second image by an exposure ratio associated with the second image and the first image to generate a modified image.

5. The apparatus of claim 4, wherein the at least one processor is configured to:

subtract a value of a pixel in the modified image from a maximum value in the first image.

6. The apparatus of claim 5, wherein the value of the pixel of the modified image is greater than or equal to the maximum value, and wherein the pixel difference corresponds to the maximum value based on the value of the pixel of the modified image being greater than or equal to the maximum value.

7. The apparatus of claim 5, wherein the value of the pixel of the modified image is less than the maximum value, and wherein the pixel difference corresponds to the difference between the value of the pixel in the modified image and the maximum value based on the value of the pixel of the modified image being less than the maximum value.

8. The apparatus of claim 1, wherein, to determine the compressed value for at least the portion of pixels in the second image, the at least one processor is configured to:

compare the pixel difference to a threshold; and based on a determination that the pixel difference is less than or equal to the threshold, use a value of the pixel difference as a compressed value for at least the portion of the pixels in the second image.

9. The apparatus of claim 1, wherein, to determine the compressed value for at least the portion of pixels in the second image, the at least one processor is configured to:

compare the pixel difference to a threshold; and based on a determination that the pixel difference is greater than the threshold, use a value of at least one pixel in the second image as a compressed value for at least the portion of the pixels in the second image.

10. The apparatus of claim 9, wherein the value of the at least one pixel used as the compressed value includes the pixel difference.

11. The apparatus of claim 1, wherein, to decompress the compressed second image, the at least one processor is configured to:

determine a pixel difference of pixels within the compressed second image; and sum the pixel difference of the pixels in the compressed second image with pixels in the first image.

12. The apparatus of claim 11, wherein, to determine of the pixel difference, the at least one processor is configured to:

add a threshold to a value of a pixel within the compressed second image based on whether the value of the pixel is greater than the threshold.

13. The apparatus of claim 1, wherein the at least one processor is configured to:

cause the first image to be stored in a cache.

14. The apparatus of claim 1, wherein the at least one processor is configured to:

downsample the first image;

cause the downsampled first image to be stored in a cache; and upsample the downsampled first image into a lossy first image.

15. The apparatus of claim 14, wherein, to compress the second image, the at least one processor is configured to:

compute a pixel difference for pixels between the lossy first image and the second image; and determine a compressed value for at least a portion of pixels in the second image based the pixel difference.

16. The apparatus of claim 14, wherein, to decompress the compressed second image, the at least one processor is configured to:

determine a pixel difference of pixels within the compressed second image; and sum the pixel difference of the pixels in the compressed second image with pixels in the lossy first image.

17. A method of generating an image, the method comprising:

obtaining a first image captured using an image sensor, the first image being associated with a first exposure;

obtaining a second image captured using the image sensor, the second image being associated with a second exposure;

compressing the second image based on a comparison of the second image with the first image, wherein compressing the second image comprises computing a pixel difference between pixels of the first image and pixels of the second image, determining a compressed value for at least a portion of the pixels in the second image based on the pixel difference;

storing the compressed second image in a memory;

obtaining the compressed second image from the memory;

decompressing the compressed second image based on a difference between the compressed second image and the first image; and generating a combined image at least in part by combining the first image and the second image;

multiplying the second image by an exposure ratio associated with the second image and the first image to generate a modified image; and subtracting a value of a pixel in the modified image from a maximum value in the first image.

18. The method of claim 17, wherein the second exposure is less than the first exposure, and wherein the combined image is a high dynamic range (HDR) image.

19. The method of claim 17, wherein determining the compressed value for at least the portion of pixels in the second image comprises:

comparing the pixel difference to a threshold; and based on a determination that the pixel difference is less than or equal to the threshold, using a value of the pixel difference as a compressed value for at least the portion of the pixels in the second image.

20. The method of claim 17, wherein determining the compressed value for at least the portion of pixels in the second image comprises:

comparing the pixel difference to a threshold; and
based on a determination that the pixel difference is greater than the threshold, using a value of at least one pixel in the second image as a compressed value for at least the portion of the pixels in the second image.

21. The method of claim 20, wherein the value of the at least one pixel used as the compressed value includes the pixel difference.

22. The method of claim 17, wherein decompressing the compressed second image comprises:
determining a pixel difference of pixels within the compressed second image; and
summing the pixel difference of the pixels in the compressed second image with pixels in the first image.

23. The method of claim 22, wherein determining of the pixel difference comprises:
adding a threshold to a value of a pixel within the compressed second image based on whether the value of the pixel is greater than the threshold.

24. The method of claim 17, further comprising:
downsampling the first image;
storing the downsampled first image in a cache; and
upsampling the downsampled first image into a lossy first image.

25. The method of claim 24, wherein compressing the second image comprises:
computing a pixel difference for pixels between the lossy first image and the second image; and
determining a compressed value for at least a portion of pixels in the second image based the pixel difference.

26. The method of claim 24, wherein decompressing the compressed second image comprises:
determining a pixel difference of pixels within the compressed second image; and
summing the pixel difference of the pixels in the compressed second image with pixels in the lossy first image.

27. An apparatus for generating one or more images, the apparatus comprising:
at least one memory; and
at least one processor coupled to the at least one memory and configured to:
obtain a first image captured using an image sensor, the first image being associated with a first exposure;
downsample the first image;
cause the downsampled first image to be stored in a cache;
upsample the downsampled first image into a lossy first image;
obtain a second image captured using the image sensor, the second image being associated with a second exposure;
compress the second image based on a comparison of the second image with the lossy first image to generate a compressed second image;
decompress the compressed second image based on a difference between the compressed second image and the lossy first image; and
generate a combined image at least in part by combining the first image and the decompressed second image.

28. The apparatus of claim 27, wherein, to compress the second image, the at least one processor is configured to:
compute a pixel difference for pixels between the lossy first image and the second image; and
determine a compressed value for at least a portion of pixels in the second image based the pixel difference.

29. The apparatus of claim 27, wherein, to decompress the compressed second image, the at least one processor is configured to:
determine a pixel difference of pixels within the compressed second image; and
sum the pixel difference of the pixels in the compressed second image with pixels in the lossy first image.

* * * * *